US012784058B2

(12) United States Patent
Mangano et al.

(10) Patent No.: US 12,784,058 B2
(45) Date of Patent: Nov. 3, 2026

(54) MOBILE ASSISTANT ENHANCED BY ARTIFICIAL INTELLIGENCE

(71) Applicant: Salesforce, Inc., San Francisco, CA (US)

(72) Inventors: Andrew Mangano, Sunnyvale, CA (US); Saket Agarwal, San Mateo, CA (US); Stephen Goldberg, Frisco, TX (US); Jean Elie Bovet, Los Angeles, CA (US); Abigail Sigler, Lake Oswego, OR (US); David Klein, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 76 days.

(21) Appl. No.: 18/384,242

(22) Filed: Oct. 26, 2023

(65) Prior Publication Data

US 2025/0139636 A1 May 1, 2025

(51) Int. Cl.
*G06Q 30/01* (2023.01)
*G06F 40/20* (2020.01)

(52) U.S. Cl.
CPC ............. *G06Q 30/01* (2013.01); *G06F 40/20* (2020.01)

(58) Field of Classification Search
CPC ................................ G06Q 30/01; G06F 40/20
See application file for complete search history.

(56) References Cited

U.S. PATENT DOCUMENTS 11,756,543 B2 * 9/2023 Touati ..................... G10L 15/22 709/224
11,763,239 B1 * 9/2023 Di Prinzio ........... G06Q 30/016 706/11

(Continued)

FOREIGN PATENT DOCUMENTS

WO WO-2025059255 A1 * 3/2025 ....... G06F 16/33295

OTHER PUBLICATIONS

Glolab-Andrzejak, Edyta; AI-Powered Customer Relationship Management—GenerativeAI-based CRM—Einstein GPT, Sugar CRM, and MS Dynamics 365. 2024, Science Direct—Elsevier, Procedia Computer Science 246, pp. 1790-1799 (Year: 2024).*

*Primary Examiner* — Dylan C White
(74) *Attorney, Agent, or Firm* — Sterne, Kessler, Goldstein & Fox P.L.L.C.

(57) ABSTRACT

Disclosed herein are system, method, and device embodiments for providing a mobile interface powered by artificial intelligence. A user remains on a single user-interface page, conducting interactions with a customer relationship management tool using natural language. The technique leverages a large language model as an intermediary middle-layer, allowing a user to engage core functions. The technique builds an appropriate prompt including the natural language and uses the large language model to build an execution plan that references tools and tasks performable in the customer relationship management tool. By chaining prompts, the technique incorporates prior interactions into subsequent prompts. Mobile-specific information such as location, images, and scanned barcodes may be included in (Continued)

a prompts. Running the large language model on the client device allows the user to perform CRM functions while operating in an offline mode, a mode that secures user data and enhances privacy.

20 Claims, 22 Drawing Sheets

(56) References Cited

U.S. PATENT DOCUMENTS

| | | | | |
|---|---|---|---|---|
| 2020/0257996 | A1* | 8/2020 | London | G06F 40/58 |
| 2023/0395076 | A1* | 12/2023 | Touati | G06F 8/30 |
| 2024/0256561 | A1* | 8/2024 | Siebel | G06F 16/254 |
| 2024/0362286 | A1* | 10/2024 | He | G06F 16/93 |
| 2024/0412720 | A1* | 12/2024 | Vasylyev | G06F 16/90332 |
| 2025/0013963 | A1* | 1/2025 | Qazvinian | G06Q 10/0639 |
| 2025/0080601 | A1* | 3/2025 | Shevchenko | G10L 15/197 |
| 2025/0117416 | A1* | 4/2025 | Rogynskyy | G06F 16/334 |
| 2025/0292302 | A1* | 9/2025 | Bennett | G06N 3/042 |
| 2026/0080864 | A1* | 3/2026 | Vu | G06F 40/30 |

* cited by examiner

500A

You are now an intelligent assistant that will help a field service technician. The next job for that technician has a random recordid of either 'a03RN000000qyUIYAH' or 'a03RN000000qyUDYAY' or 'a03RN000000qyU8YAI'

Jobs start with a status of "Scheduled". When the job is done, update status to "finished". When the job is closed, update status to "closed". When you read "starting the job", it means the status should be "In Progress".

Here is the JSON structure of a job that need to be used:

```
{
     "job": {
        "recordId": "XYZ",
          "technicianName": "Glen",
          "caseStatus": "Open",
          "location": "123 Maple Street, Anytown, PA 17101",
          "customerName": "Jon Doe"
     }
}
```

What is my next job? The output should be JSON only.

FIG. 5A

500B

```
You are now an intelligent assistant that will help a field
service technician. The next job for that technician has a
random recordid of either 'a03RN000000qyUIYAH' or
'a03RN000000qyUDYAY' or 'a03RN000000qyU8YAI'

Jobs start with a status of "Scheduled". When the job is
done, update status to "finished". When the job is closed,
update status to "closed". When you read "starting the job",
it means the status should be "In Progress".

Here is the JSON structure of a job that need to be used:
{
"job": {
"recordId": "XYZ",
"technicianName": "Glen",
"caseStatus": "Open",
"location": "123 Maple Street, Anytown, PA 17101",
"customerName": "Jon Doe"
}
}

\{text}
```

FIG. 5B

500C

You are now an intelligent assistant that will help a field service technician. The next job for that technician has a random recordid of either 'a03RN000000qyUIYAH' or 'a03RN000000qyUDYAY' or 'a03RN000000qyU8YAI'

Jobs start with a status of "Scheduled". When the job is done, update status to "finished". When the job is closed, update status to "closed". When you read "starting the job", it means the status should be "In Progress".

Here is the JSON structure of a job that need to be used:

```
{
    "job": {
        "recordId": "XYZ",
        "technicianName": "Glen",
        "caseStatus": "Open",
        "location": "123 Maple Street, Anytown, PA 17101",
        "customerName": "Jon Doe"
    }
}
```

What is my next job? The output should be JSON only.

```
{
    "job": {
        "recordId": "a03RN000000qyUIYAH",
        "technicianName": "Glen",
        "caseStatus": "Scheduled",
        "location": "123 Maple Street, Anytown, PA 17101",
        "customerName": "Jon Doe"
    }
}
```

The next job location is "One Infinite Loop", technicianName is "Glen", customerName is "John Apple".

Thanks. I am at the location now and starting the job. The output should be JSON only.

FIG. 5C

500D

```
As an intelligent assistant of Electron Motors Dealership, please provide response in JSON
format.
############################################################################################
These are available records and their corresponding fields in this format.

Employee : { employee_id, first_name , last_name , contact_number}
Store : { store_id, address }
Shift : { employee_id(), store_id, start_timestamp, end_timestamp }
Customer : { customer_id, first_name , last_name , email_id, contact_number}
Visit : { custmer_id, employee_id, date }
Car : { car_id, VIN, store_id, make, model, year, color, price, available, horse_power}
Test Drive : { customer_id, employee_id, date, make, model }
Purchase : { customer_id, date, car_id, employee_id}
############################################################################################
For record creation these fields are required.
Customer record creation : first_name , last_name , email_id are mandatory.
Car record creation : VIN, store_id, make, model, year, color, price, available are
mandatory.
############################################################################################
If any of the field is missing during record creation, appropriate message should be
delivered.
```

FIG. 5D

MOBILE ASSISTANT ENHANCED BY ARTIFICIAL INTELLIGENCE

BACKGROUND

A customer relationship management ("CRM") tool allows organizations to manage customer relationships and organize data associated with those relationships. A CRM tool may provide billing services, marketing, e-commerce tools, configure-price-quote ("CPQ") solutions, engagement tracking, and other applications. Such a solution allows organizations to manage data about transactions between, with, and/or among customers and to harness that data to derive analytical conclusions. A CRM solution may support mobile devices and mobile applications.

Artificial intelligence ("AI") is an umbrella term to describe techniques that mimic human intelligence using computers' capabilities. Some AI solutions leverage neural networks and deep learning models. Whereas other approaches to analyzing real-world information may involve hard-coded processes, neural networks learn to resemble human behaviors and make human-like inferences gradually through training with examples. One specific type of model is a large language model ("LLM"), named so because of the copious amounts of training data used to train the model. Popular LLMs include OPENAI's generative pre-trained transformer (GPT-3 and GPT-4), LaMDA, PaLM LLM, BLOOM, XLM-RoBERTa, NeMO LLM, XLNet, COHERE, GLM-130B, SAGEMAKER, VERTEX, CLAUDE, etc.

BRIEF DESCRIPTION OF THE DRAWINGS/FIGURES

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIGS. 5A-5D illustrate exemplary prompts, according to some embodiments.

Figure 1:
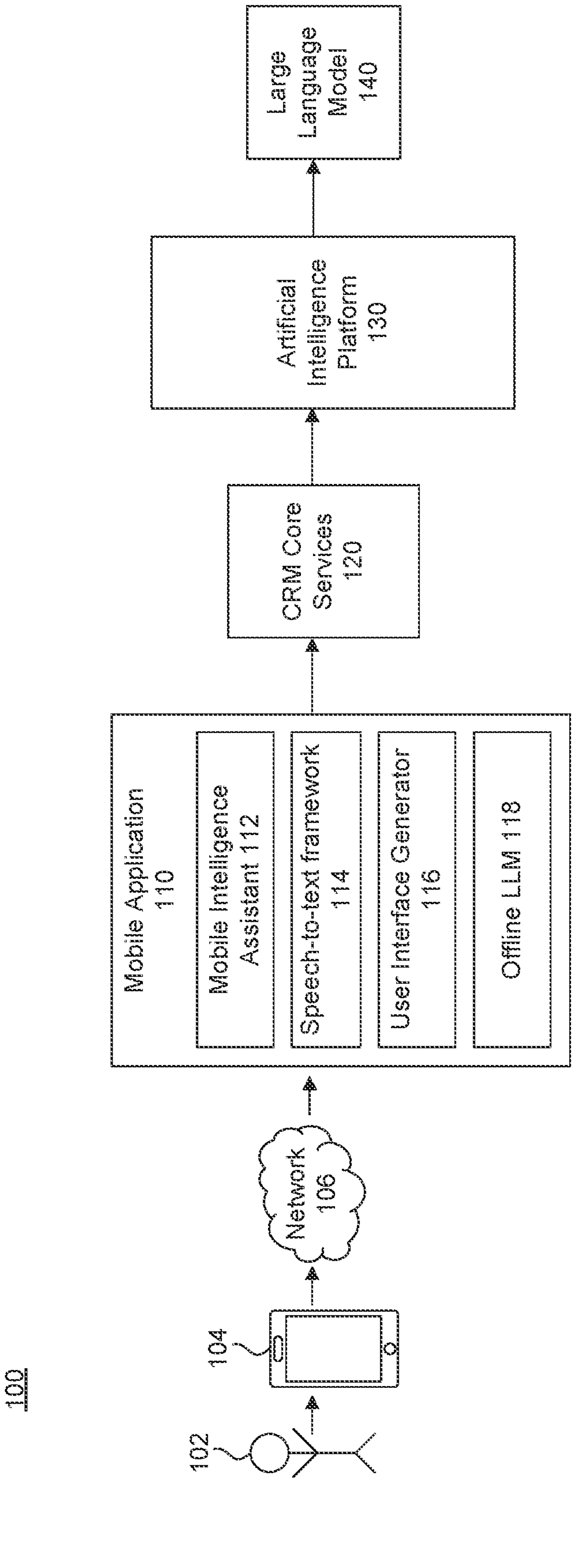
FIG. 1 is a block diagram of environment for implementing a mobile intelligent assistant, according to some embodiments.

The present disclosure will be described with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for providing a mobile interface powered by AI that allows a user to interact with a CRM tool in a conversational manner. This technique employs generative AI and leverages an LLM as an intermediary middle layer. This allows a user to engage core CRM functions (e.g., Create-Read-Update-Delete ("CRUD") actions) using natural language.

CRM tools generate graphical user interfaces through which users access the tools' capabilities. For example, users may track sales, generate quotes, search inventory, create accounts, opportunities, and leads, etc. CRM tools may provide mobile-specific applications that are tailored to deliver the CRM functionality to mobile devices and mobile usage scenarios.

Conventional mobile-interface design requires a user to navigate using buttons or links to particular pages. For example, a user of a CRM tool may click a menu item for Dashboards, Tasks, Opportunities, Accounts, Contacts, Search, etc. Each menu item may route the user to a particular page in the CRM tool. Upon arriving on a particular page, the user must navigate around the page, and perhaps select another link to perform a particular task. Such tasks include adding/editing a contact, searching, viewing dashboards, logging a sales opportunity, tracking client correspondences, and a panoply of other suitable functions in the CRM tool.

However, these legacy interface-design techniques put the onus on the user to translate any goal that the user has in mind (e.g., "I would like to add a contact to my CRM tool") into a concrete sequence of steps. For example, if a user wants to add a contact, the user may need to click Contacts, navigate to an appropriate location on the Contacts page, click Add a Contact, enter the information about the contact, and submit the page. This is just an example goal, the point being that a user needs to understand how to complete the full array of functions available in the CRM tool via the mobile interface. This puts a significant cognitive burden on the user. It also is time consuming to execute these steps because it requires multiple actions/clicks/scrolls/gestures from the user. This inefficiency is exacerbated in mobile usage scenarios, where time is at a premium and navigation is more constrained and difficult.

Accordingly, a need exists to provide a mobile user interface for a CRM tool that allows a user to perform the full array of CRM functionality while interacting with a user interface in a conversational manner—i.e., using natural language. The disclosed approach achieves a technical benefit over conventional systems because a user remains on a single user-interface page and can engage the full array of CRM functionalities. This obviates the need for the user to navigate through the CRM tool to accomplish their goals. Instead, the user is self-contained in a conversational flow, with the entirety of the conversation viewable as a breadcrumb trail. This conversational interface will be referred to in the below disclosure as the mobile intelligent assistant ("MIA").

However, a technical difficulty arises in the MIA-namely, understanding a user's goal, how to achieve this goal in the CRM tool, and then executing the necessary functions to achieve the goal. The MIA may need to determine objects and actions that are available in the CRM tool. Then the MIA may need to execute the actions to retrieve/manipulate these objects to complete the desired goal.

Accordingly, a need exists to deploy a middle layer that can receive natural language from a user of a CRM tool and generate the appropriate function calls to available tools to achieve a goal indicated in the natural language. Towards this end, the inventors recognize the benefits of leveraging generative AI and LLMs to serve as this middle layer.

A neural network is a type of AI that is trained to make human-like inferences. An LLM is a particular type of neural network that learns to mimic human behaviors using large amounts of training data. A generative pre-trained transformer ("GPT") is a particular type of LLM trained on large data sets of unlabeled text that generates content such as text, images, and music in a manner that resembles human creativity. The MIA may leverage the capabilities of an LLM to translate the user's natural language into specific, performable actions in a CRM tool. The MIA then builds the user interface in a conversational fashion based on responses from the LLM and data generated by the actions.

Leveraging a GPT to serve as the middle layer between the MIA and the CRM tool creates an additional technical problem in prompt engineering—i.e., how to engineer appropriate prompts to feed to the GPT. A prompt is a sentence, paragraph, set of keywords, or text provided to a GPT an input seed to guide GPT output. The MIA may craft an initial prompt that include a reasoning strategy (text guiding the LLM), an input model (guidance on the input data such as a JSON schema), and an output model (guidance on the output such as JSON schema). The LLM may generate an execution plan after being fed the initial prompt. The execution plan may reference a tool or tools(s) available in the CRM tool (e.g., an object-query-language tool, an inventory tool, price quoting tool, etc.). The execution plan may also include tasks (e.g., API calls) to execute on those tools. These API calls may return a response that is then displayed in an appropriate format in the MIA.

A further technical benefit may be achieved by using prompt chaining. Prompt chaining involves including the initial prompt and the response in a subsequent prompt. This allows the MIA to incorporate knowledge from prior interactions into a prompt, making the LLM aware of the history of the conversation.

A further technical benefit may be achieved by using prompt templates. A prompt template may include placeholders that can be injected at run-time with appropriate information. The appropriate information may include the natural language input and information queried or retrieved from the CRM tool or ancillary tools. The information may be injected into the prompt prior to sending the prompt to the LLM. In some embodiments, prompt templates may be domain-specific—i.e., uniquely tailored based on a customer type or other suitable characteristic in the CRM tool.

A further technical benefit may be achieved by injecting mobile-specific information into a prompt. Given the unique types of features offered by mobile devices and the nature of the information that is accessible to mobile devices, the MIA is uniquely positioned to leverage focused information about a user's context. The mobile-specific, contextual information may be a location, image, or a scanned barcode that provides the LLM with additional user context. Because some actions performable in the CRM tool may accept context information as parameters—e.g., an inventory tool may accept an image of a scanned barcode as an input—the MIA may determine that a user-specified goal requires an action that uses the barcode and may request this information from the user.

A further technical benefit may be realized by situating an LLM on client devices. The benefits of running a client-side LLM include: decentralization of cost, faster paced iteration and experimentation, enhanced privacy, improved performance, and the ability to serve offline use cases.

A client-side LLM supports offline use cases where, e.g., a user loses network connectivity or elects to operate a device in an offline mode. In such a circumstance, the user may still perform actions in the MIA and then synchronize the client-side data with the CRM tool upon returning to connectivity or to an online mode. For example, a user may elect to avoid accessing an untrustworthy public network but may still want to complete CRM functions in the CRM tool. In such an instance, the user may access the CRM tool in the offline mode by choice, perform CRM functions in the offline mode, and then synchronize (if necessary) at a later point in time. Thus, an offline mode supported by a client-side LLM may achieve a further technical benefit of enhancing user privacy and securing user data.

Similarly, a technical benefit may be realized by using a hybrid architecture that leverages both local and hosted LLMs. Multiple on-device LLMs may be used instead of a single LLM or multiple LLMs may be positioned both on the cloud and on the client-side. In this manner, tasks may be routed to different purpose-built LLMs to accomplish different tasks.

A further technical benefit may be realized by using an LLM specifically trained using CRM data. Popular LLMs include OPENAI's generative pre-trained transformer (GPT-3 and GPT-4), LaMDA, PaLM LLM, BLOOM, XLM-RoBERTa, NeMO LLM, XLNet, COHERE, and GLM-130B. However, the inventors recognize that improved performance may be achieved in both accuracy and efficiency using an LLM trained using CRM data in particular, especially in the context of the MIA.

FIG. 1 is a block diagram of environment 100 for implementing a mobile intelligent assistant, according to some embodiments. As illustrated in FIG. 1, environment 100 may include user 102, device 104, mobile application 110, MIA 112, speech-to-text framework 114, user interface generator 116, offline LLM 118, CRM core services 120, AI platform 130, and LLM 140.

User 102 may be an individual using a CRM tool to manage customer relationships and organize data associated with those relationships. User 102 may be a member of a business, organization, or other suitable group. User 102 may be a human being, but user 102 may be an AI construct. User 102 may be tracked with a unique identifier and may login to the CRM tool using appropriate credentials. User 102 may interact with the MIA by providing natural language inputs in the form of text or speech to accomplish a goal or task within the CRM tool.

Device 104 may be a personal digital assistant, desktop workstation, laptop or notebook computer, netbook, tablet, smart phone, mobile phone, smart watch or other wearable, appliance, part of the Internet-of-Things, and/or embedded system, to name a few non-limiting examples, or any combination thereof. Although device 104 is illustrated in the example of FIG. 1 as a single computer, one skilled in the art(s) will understand that device 104 may represent two or more computers in communication with one another. Therefore, it will also be appreciated that any two or more components of device 104 may similarly be executed using some or all of the two or more computers in communication with one another.

Network 106 may be any network or combination of networks including the Internet, a local area network (LAN), a wide area network (WAN), a wireless network, a cellular network, or various other types of networks as would be appreciated by a person of ordinary skill in the art.

Mobile application 110 may allow user 102 to manage customer relationships and perform other functions of a CRM tool while operating in a mobile design paradigm—e.g., while using device 104. Mobile application 110 may provide billing services, marketing, e-commerce tools, configure-price-quote ("CPQ") solutions, engagement tracking, and other cloud-based applications related to CRM. Interfaces to access these features may be designed specifically for mobile devices. Because mobile devices have constrained input methods and smaller screen sizes as compared to desktop devices, mobile interfaces lend themselves to certain human-computer interaction techniques that will be understood by one skilled in the relevant arts. Mobile application 110 may support a broad range of low-code/no-code customizations (e.g., to the user interfaces of the CRM tool), integrate third-party applications, and integrate AI to support the unique needs of different organizations.

MIA 112 may be incorporated into mobile application 110 to provide a particularized mobile user interface for triggering CRM functionality in response to a natural language input received from user 102. MIA 112 may inhabit a single, self-contained user-interface page, with the entirety of the conversation viewable as a breadcrumb trail. MIA 112 may determine an execution plan to achieve a goal stated in a user's natural language using an LLM. MIA 112 may then route appropriately formatted API calls to tools provided by the CRM call to achieve the goal. MIA 112 may then update the interface in an appropriate fashion to indicate the activated functionality.

Speech-to-text framework 114 may be an engine for deciphering and interpreting speech received from user 102 in MIA 112. Speech-to-text framework 114 may receive as input an audio file and return as output a text string. In an embodiment, speech-to-text framework 114 may leverage a third-party voice recognition tool or speech-to-text service.

User interface generator 116 may be employed by MIA 112 to render user interfaces for user 102. Example user interfaces are discussed below with reference to FIGS. 2A-2M. User interface generator 116 may create an appropriate conversational interface that remains on a single page throughout interactions with user 102. The page may receive natural language input from a user and provide an appropriate response. User interface generator 116 may create appropriate templates, stylesheets, etc. to realize this conversational interface as will be understood by one skilled in the relevant arts. Components may be generated server-side and transmitted to device 104, generated on device 104 using client-side techniques, or compiled using a hybrid of these two approaches. In an embodiment, user interface generator 116 may provide client-side libraries that control dynamic interactions between user 102 and MIA 112 and facilitate periodic communications with CRM core services 120.

Offline LLM 118 may be a neural network trained to make human-like inferences using large amounts of training data. Offline LLM 118 may be used by MIA 112 to derive an execution plan that translates a user's natural language input into specific, performable actions in a CRM tool. By storing and running the LLM on the client device, the system may improve the cost, privacy, and performance of interactions with the LLM. Moreover, by leveraging offline LLM 118, MIA 112 may serve offline use cases—i.e., a user may go offline, complete an action in the CRM tool using the MIA, and then sync with the CRM tool when the user goes back online. In an embodiment, offline LLM 118 may be trained using CRM data. In some embodiments, offline LLM 118 may not be used. In other embodiments, MIA 112 may leverage a hybrid architecture that leverages both offline LLM 118 and LLM 140 (discussed below). In still other embodiments, multiple on-device LLMs may be used as offline LLM 118 instead of a single LLM. Multiple LLMs may be positioned both on the cloud and on the client-side. In such embodiments, requests may be routed to different purpose-built LLMs to accomplish different tasks based on the customer type, the nature of the request, and other suitable factors.

CRM core services 120 may provide core services for the CRM tool. CRM core services 120 may provide, integrate, and access a variety of services, micro-services, APIs, data repositories, file servers, and other cloud-based devices and functions. CRM core services 120 may include a variety of prebuilt applications for managing customer relationships, marketing, sales, and customer service. CRM core services 120 may include a marketplace of cloud applications integrated with the CRM tool to allow a customer to customize their solution with a variety of additional applications. For example, CRM core services 120 may include or facilitate access to a tool for performing CRUD operations against CRM objects-such a tool may allow a customer to run queries, update CRM information (contacts, sales, etc.), and otherwise retrieve CRM data. CRM core services 120 may also support integration of customer-specific tools applications and APIs specific to a particular customer or customer type. For example, a car dealership may access a third-party vehicle management tool within their CRM application.

AI platform 130 may house a collection of AI technologies and services integrated with CRM core services 120. AI platform 130 may provide natural language processing, recommendation engines, marketing insights, advanced analytics, focused searching, and other suitable AI features. AI platform 130 may provide a mobile AI service to assist the MIA in responding to natural language input, such as illustrated below in FIG. 3. AI platform 130 may provide a variety of services, micro-services, APIs, etc. to support techniques such as prompt grounding, prompt chaining, domain adaptation. AI platform 130 may incorporate runtime performance tools and other services for integrating with commercially available GPTs and internal LLMs.

LLM 140 may be a neural network trained using large amounts of training data. In an embodiment, LLM 140 may be a GPT that generates content resembling that produced by humans. LLM 140 may translate user's natural language into specific, performable actions in a CRM tool. Various commercially available LLMs may be employed as LLM 140 within the context of this disclosure. However, in one embodiment, LLM 140 may be trained using CRM data in particular or trained using data in data lakes and silos associated with the CRM tool.

FIGS. 2A-2M are example screen displays of MIA 112, according to some embodiments. The screen display provided in screen display 200A-200M are merely exemplary, and one skilled in the relevant art(s) will appreciate that many approaches may be taken to provide suitable interfaces in accordance with this disclosure.

Figure 2A:
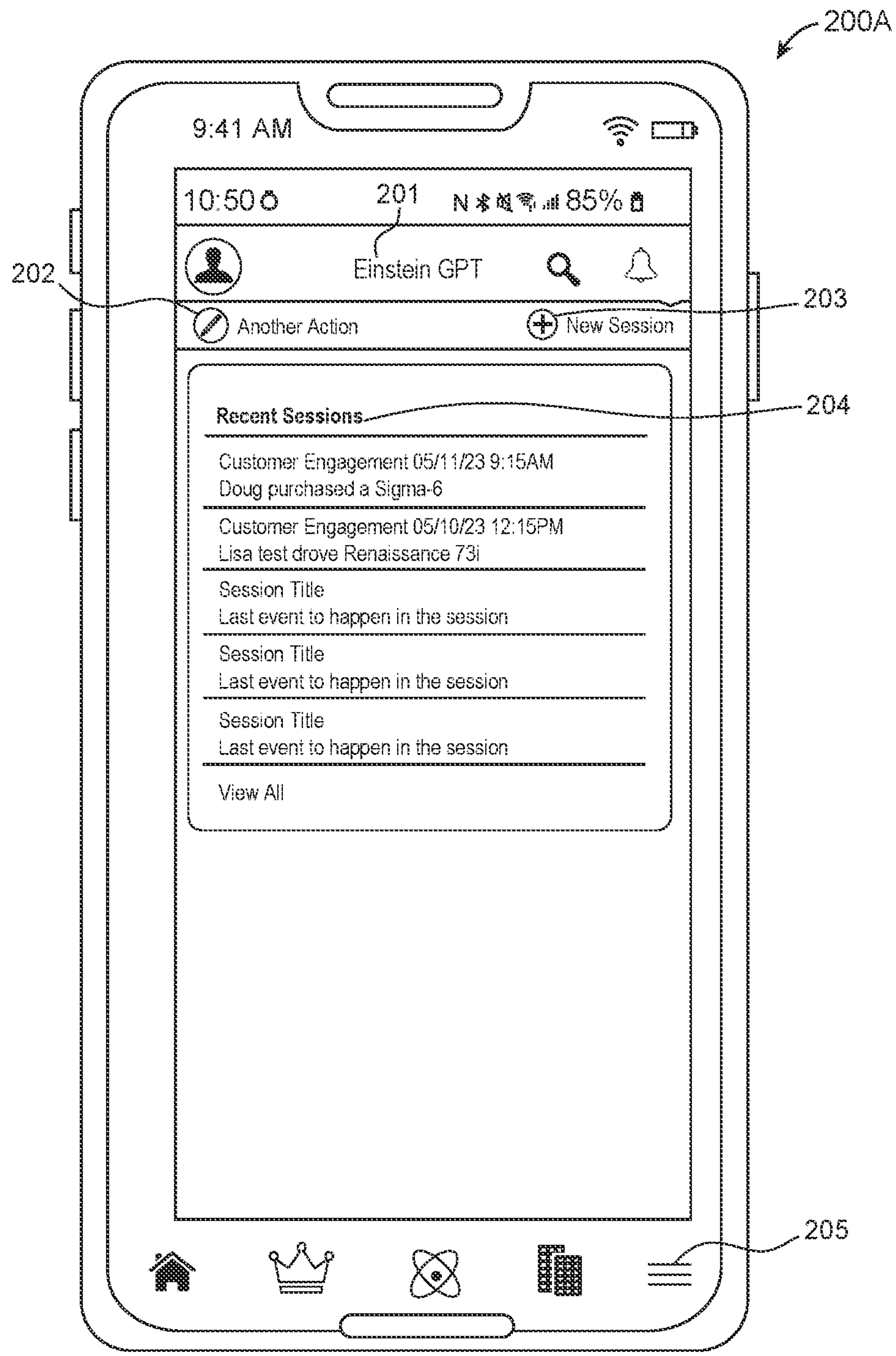
FIGS. 2A-2N are example screen displays of a mobile intelligent assistant, according to some embodiments.
Figure 2B:
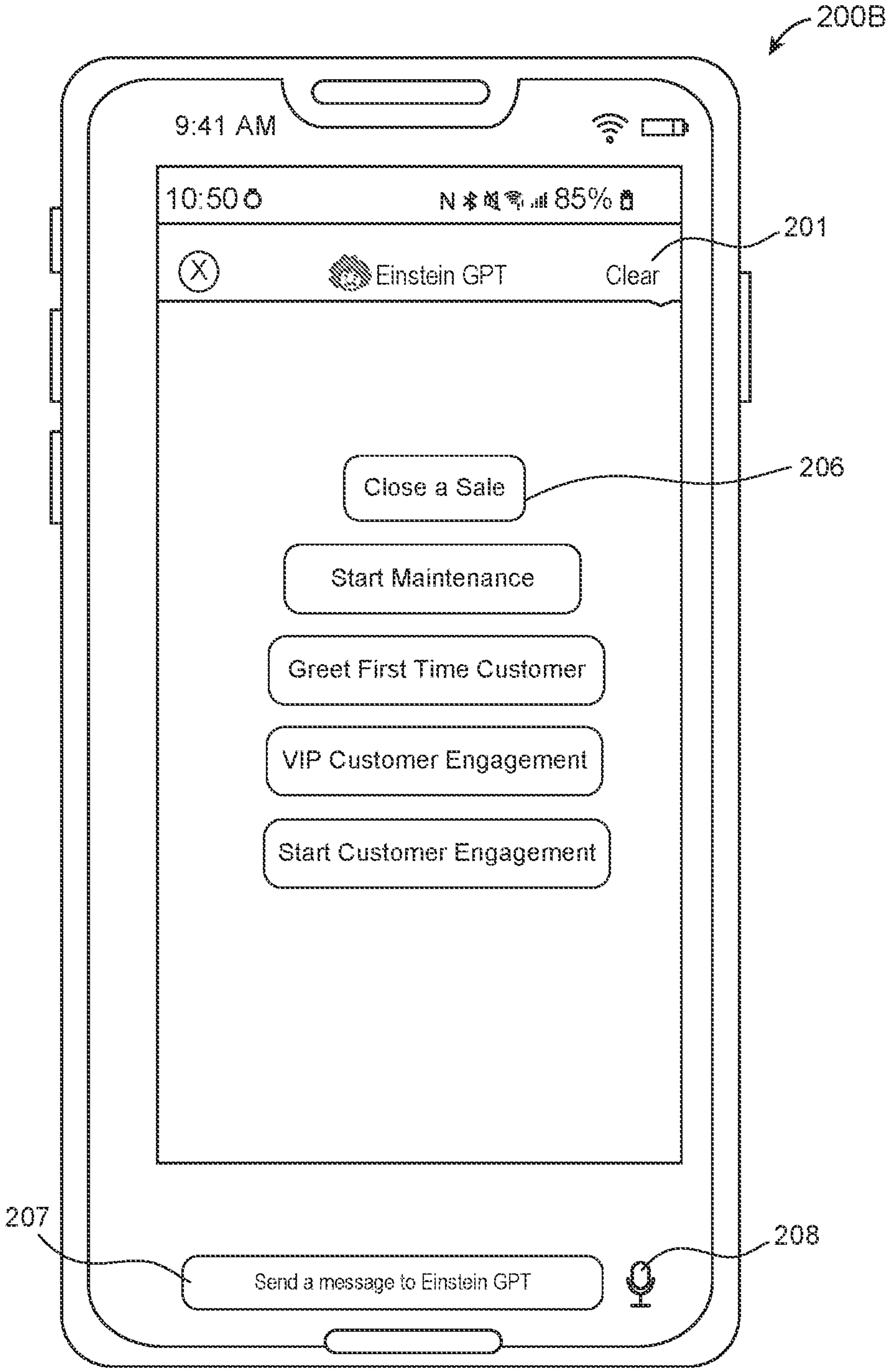
Figure 2C:
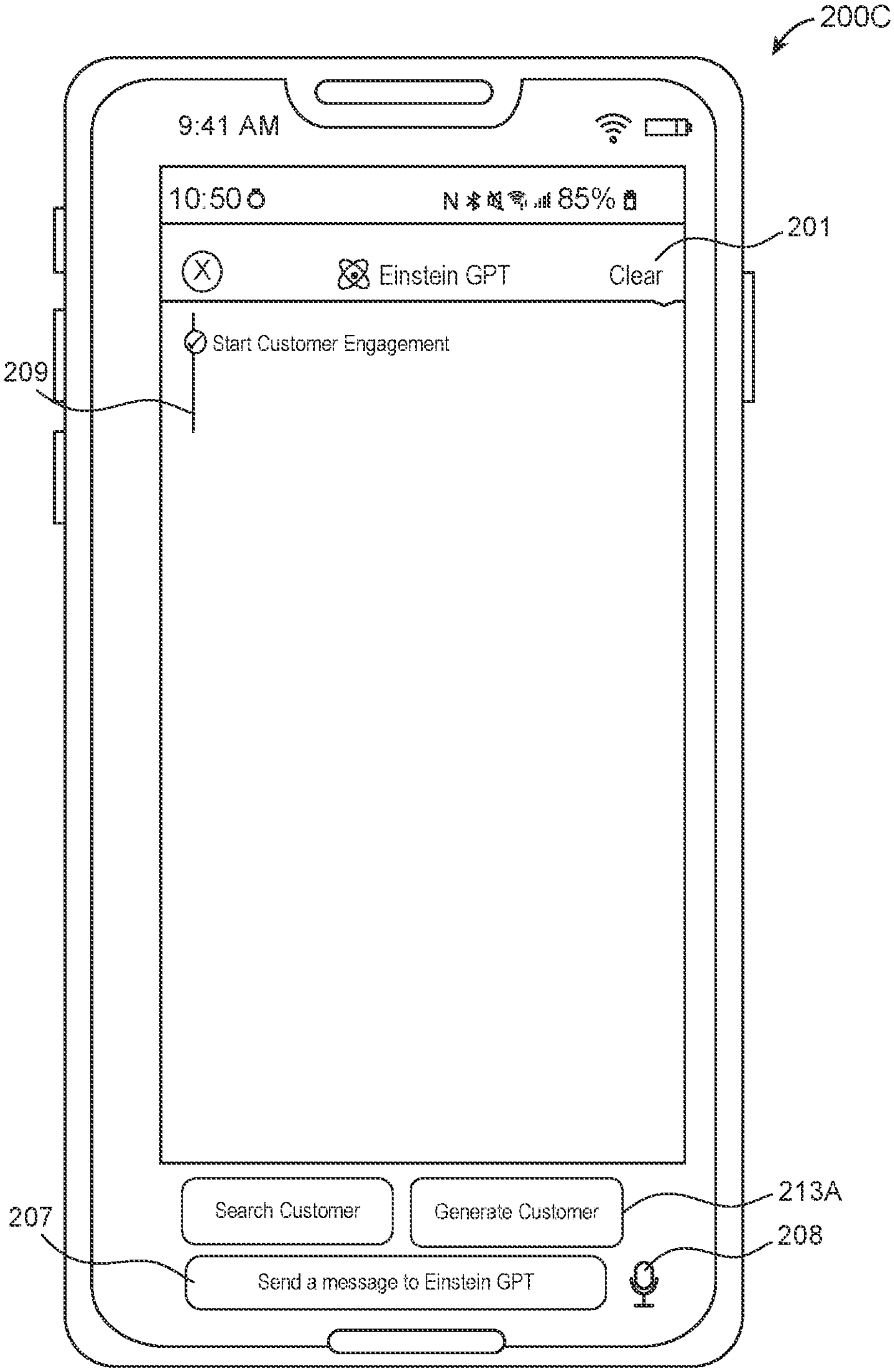
Figure 2D:
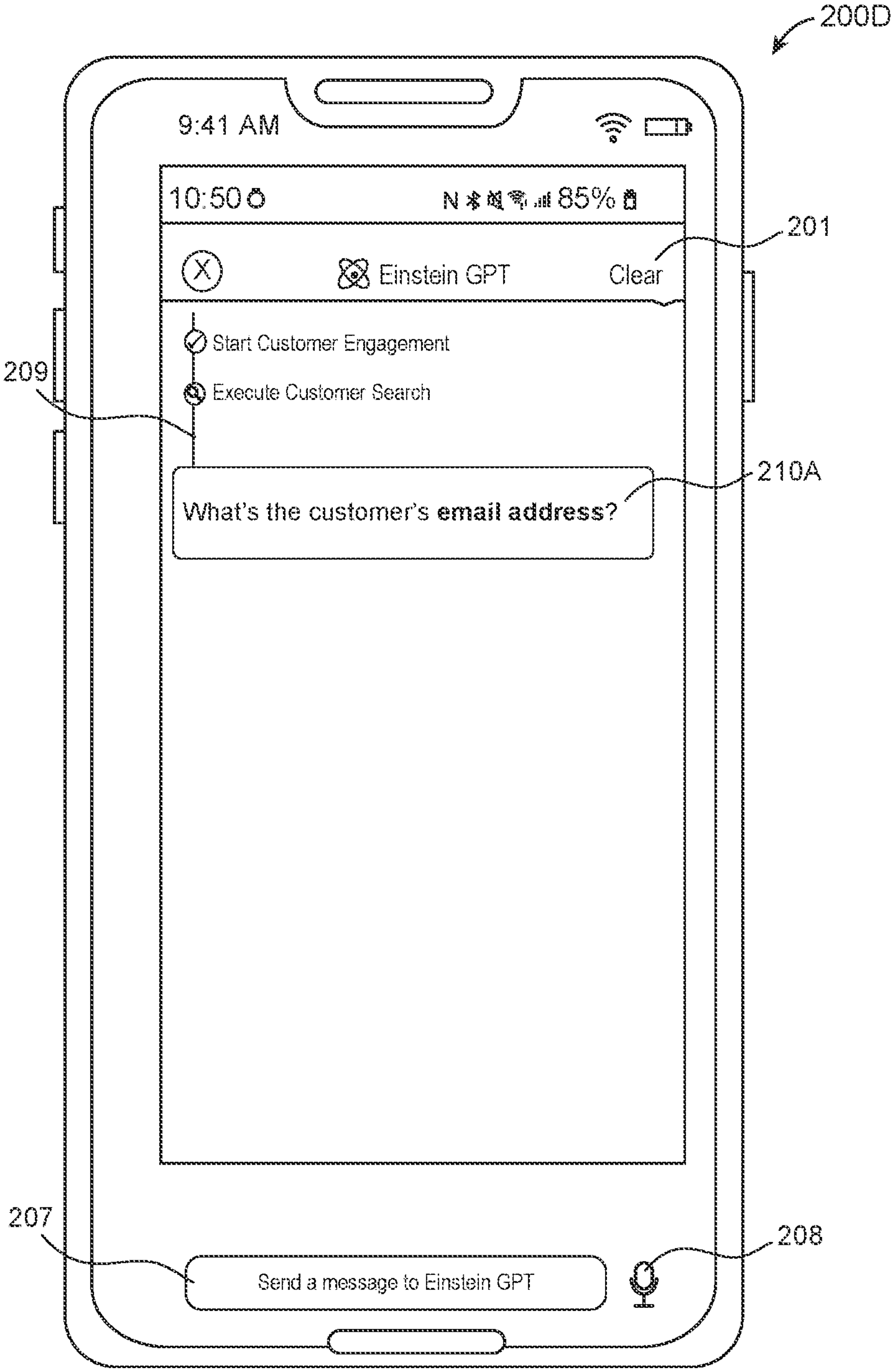
Figure 2E:
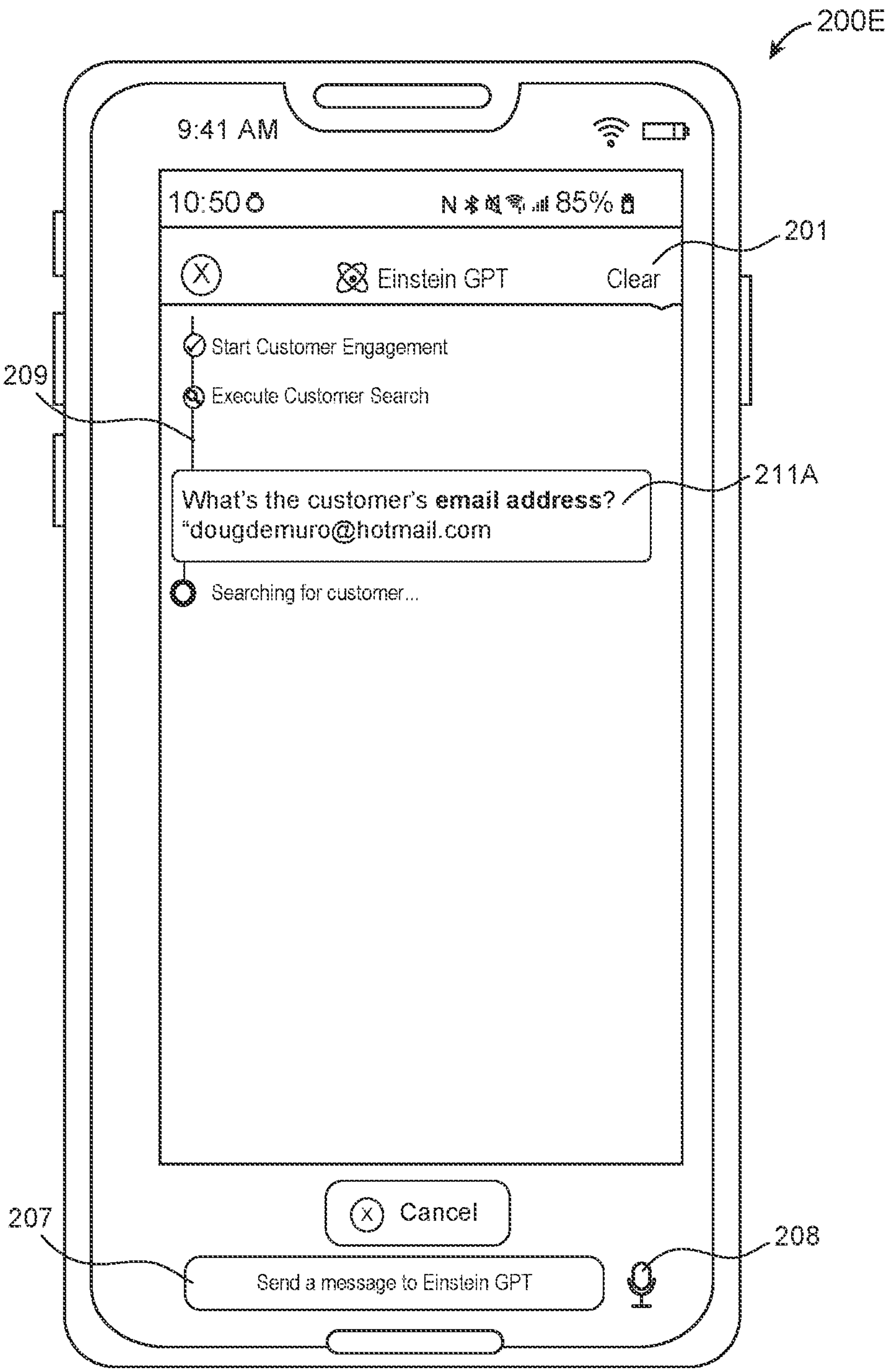
Figure 2F:
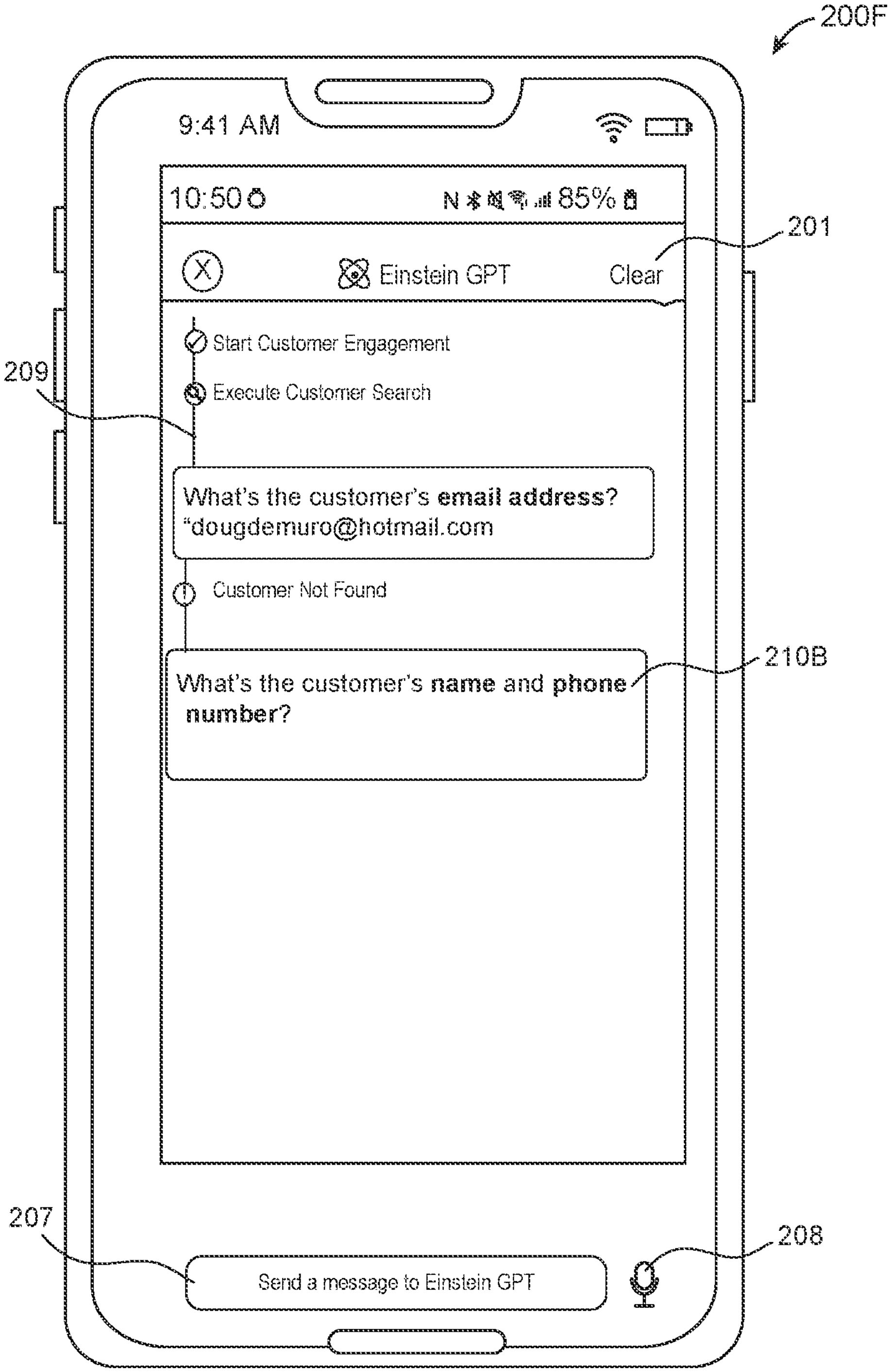
Figure 2G:
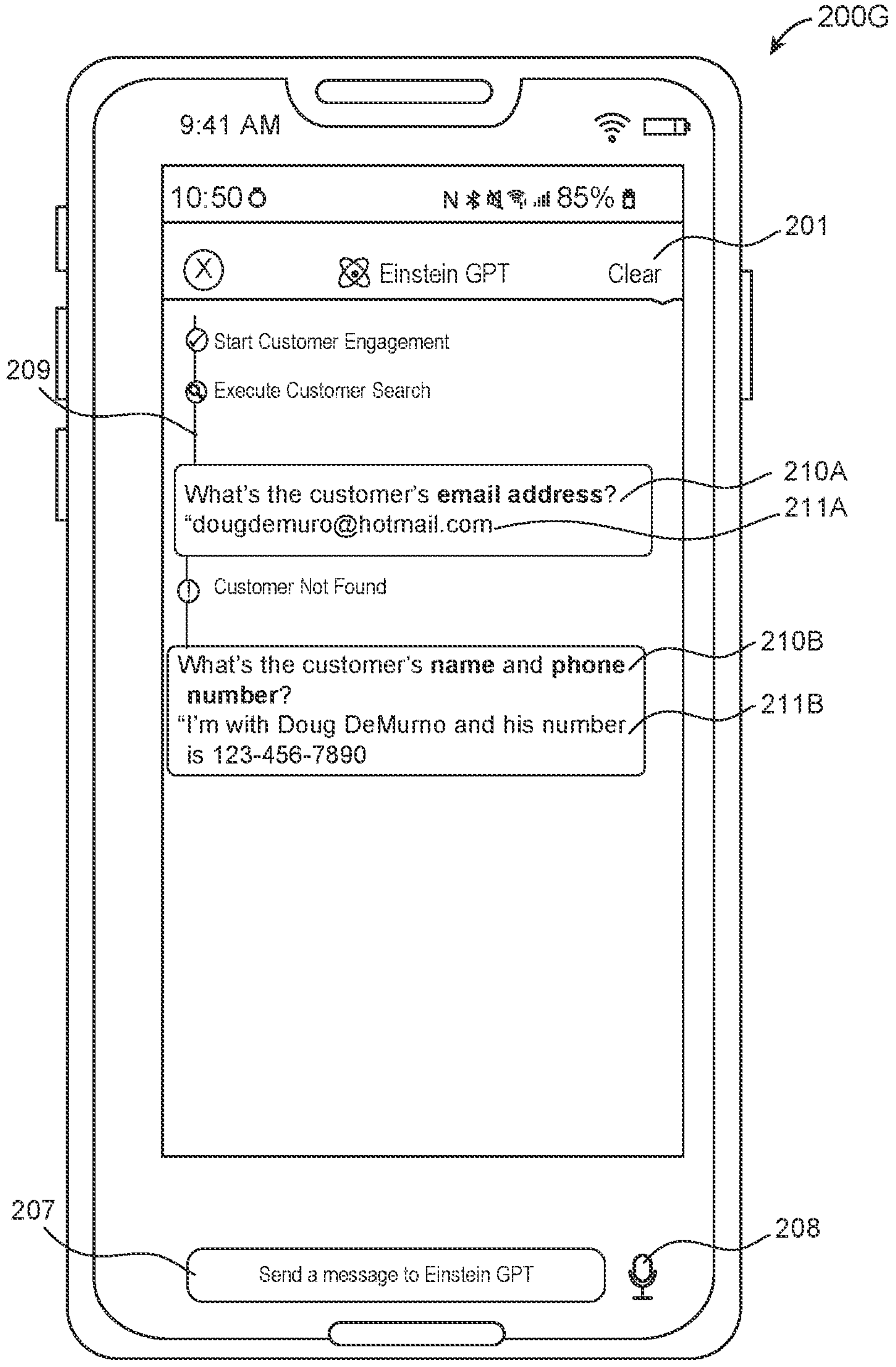
Figure 2H:
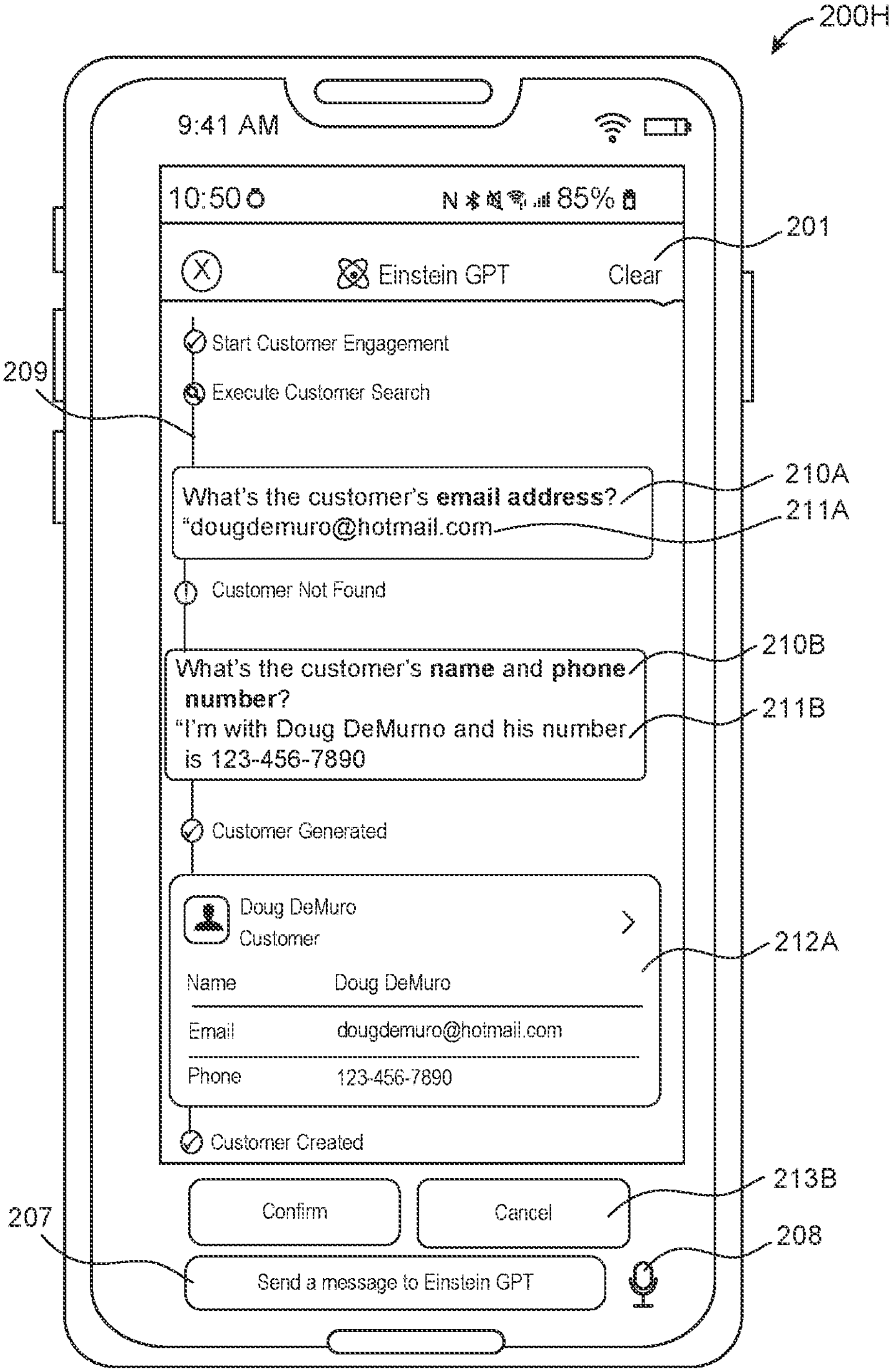
Figure 2I:
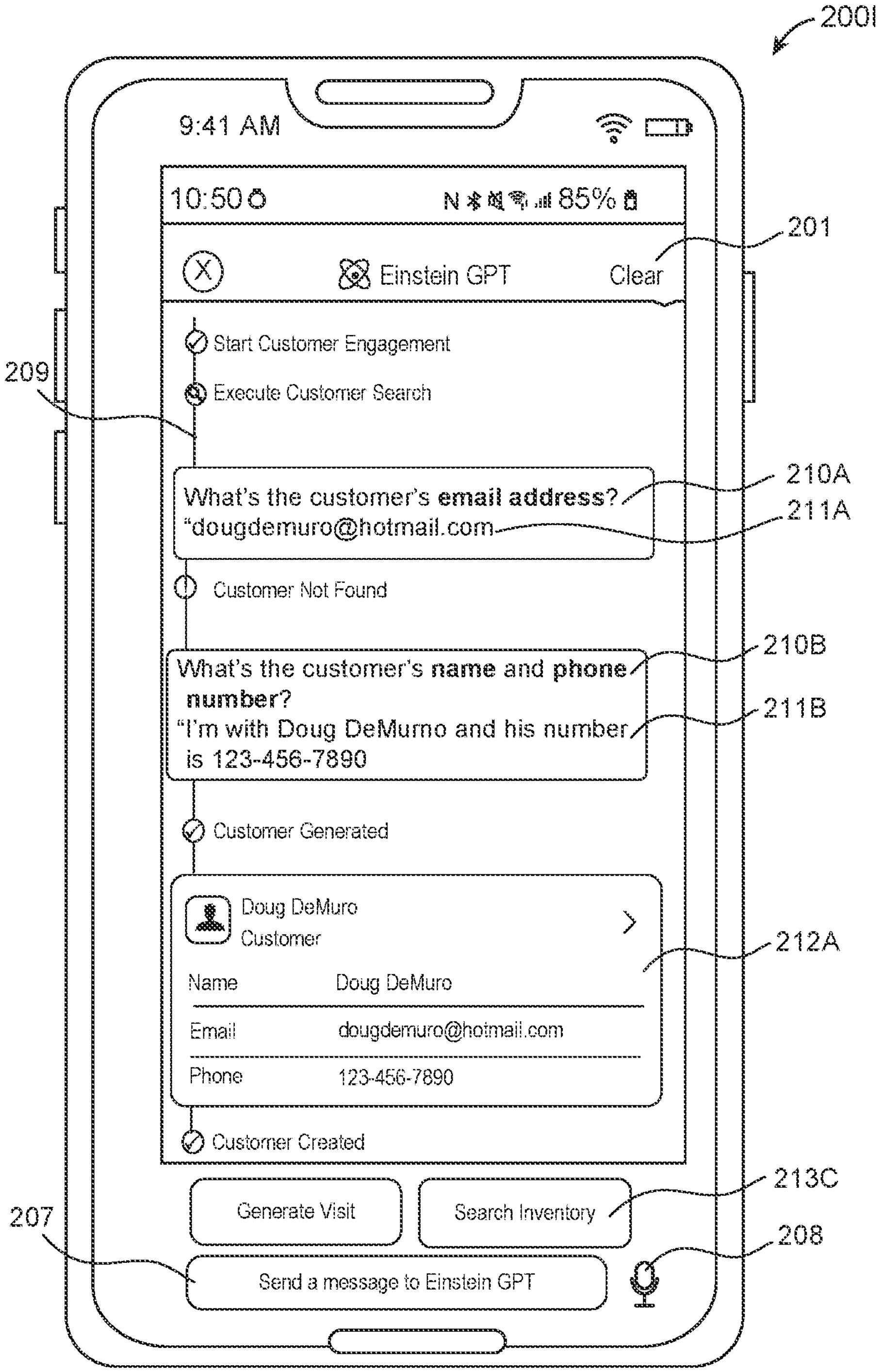
Figure 2J:
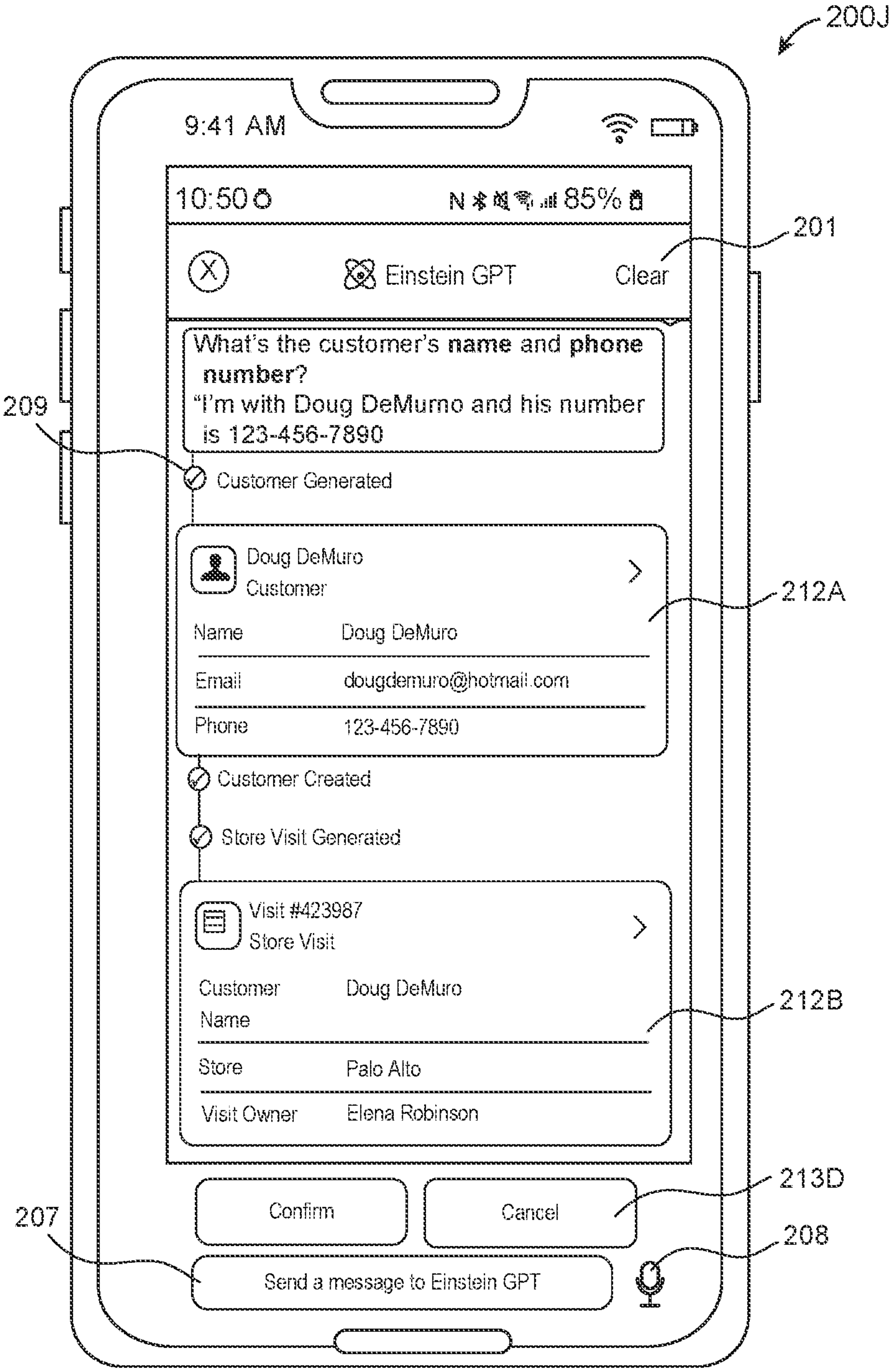
Figure 2K:
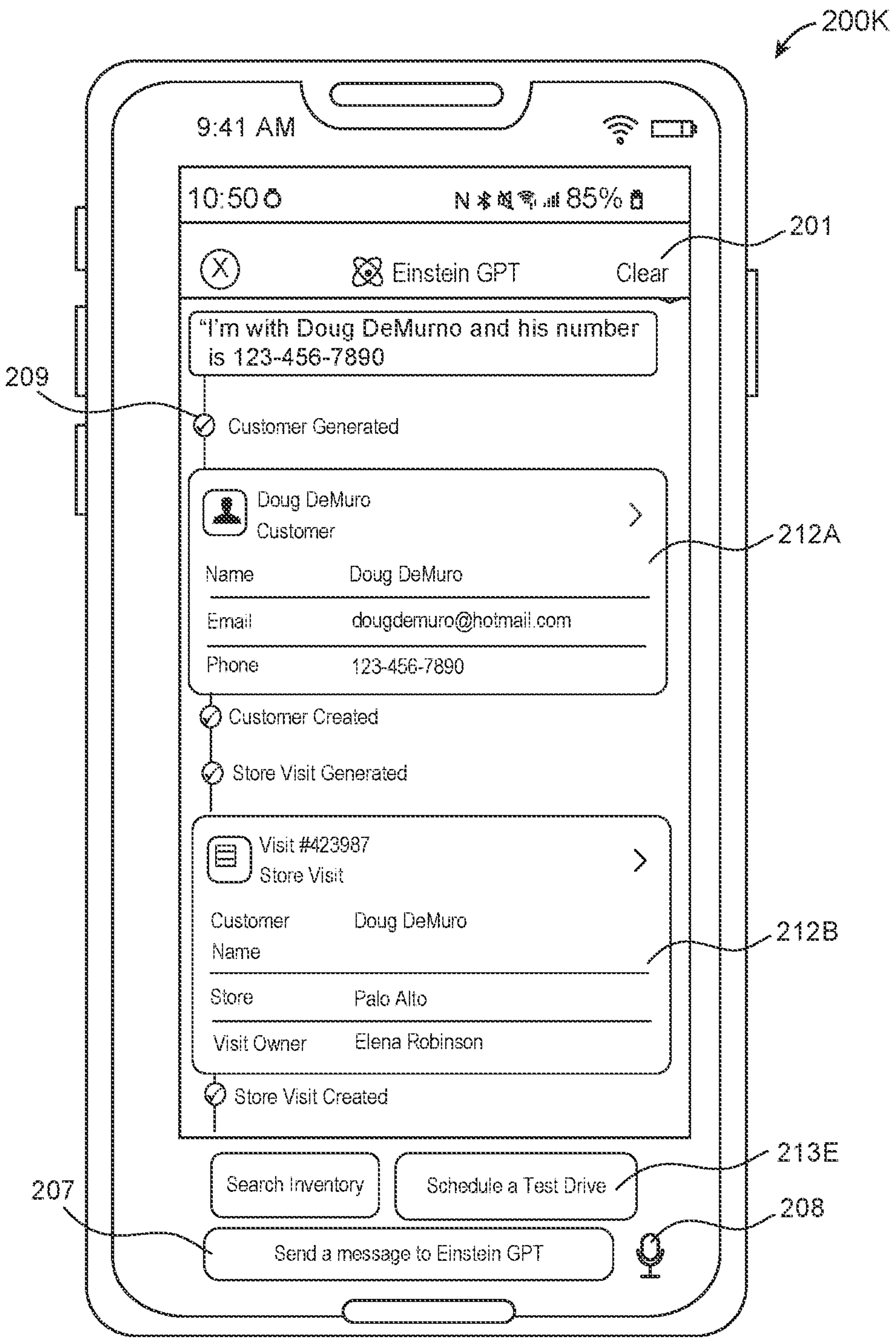

Screen display 200A displays a landing page allowing user 102 to commence the user interface provided by MIA 112 in mobile application 110. Screen display 200A displays past sessions conducted by user 102 in MIA 112. Screen display 200A allows user 102 to start additional sessions and perform new actions. As illustrated in FIG. 2A, screen display 200A may include mobile tool 201, action button 202, session button 203, recent sessions 204, and navigation items 205.

Mobile tool 201 may be provided by MIA 112 as a conversational interface for performing CRM functionality using natural language. Action button 202 may allow user 102 to enter another action (i.e., continue the current session with further interactions), and session button 203 may allow user 102 to commence a new session (i.e., ending the current session and starting a totally new session). Recent sessions 204 may display past sessions, i.e., previous interactions between user 102 and MIA 112. In some embodiments, MIA 112 may allow user 102 to resume a past session thus allowing the LLM to have knowledge of the prior interactions through prompt chaining, as discussed in further detail below. Navigation items 205 may provide a variety of navigation elements to allow user 102 to navigate the mobile CRM tool—e.g., navigation items 205 may include a home button, a search button, a tools button, etc.

Screen display 200B displays a starting page of the conversational interface provided by MIA 112, e.g., after user 102 clicks "New Session" in screen display 200A. Screen display 200B displays suggestions 206 that may be recommended actions to perform. Suggestions 206 may tailored to the particular customer or customer type engaging MIA 212. Suggestions 206 may include prior actions conducted by the user, recommended actions generated by a recommendation engine, tailored actions for the customer type, or other suitable starting actions. However, screen display 200B may also include input box 207 in which user 102 may enter a natural language input. Thus, user 102 is not constrained in MIA 112 by suggestions 206 and is free to enter any natural language input to interact with MIA 112. Voice button 208 may be clicked to allow user 102 to provide natural language by speaking. Audio from the spoken natural language input may be translated into a text string by speech-to-text framework 114.

Screen display 200C displays a next page of MIA 112, e.g., after user 102 clicks "Start Customer Engagement" in screen display 200B. Screen display 200C illustrates breadcrumbs 209, which display the steps and actions performed during the current session. In screen display 200C, this includes only "Start Customer Engagement" because that is the only step undertaken by user 102 to this point, but as will be clear in subsequent screen displays, breadcrumbs 209 may update as user 102 continues to take additional actions in MIA 112. Screen display 200C displays input box 207 and voice button 208. Screen display also displays user action 213A, which provides appropriate hints regarding actions that a user may want to perform after starting the customer engagement. However, user 102 may enter any natural language in input box 207.

Screen display 200D displays a next page of MIA 112, e.g., after user 102 clicks "Search Customer" in screen display 200C. Screen display 200D displays user query 210A asking the user "What's the customer's email address?" Breadcrumbs 209 now includes both "Start Customer Engagement" and "Execute Customer Search."

Screen display 200E displays a next page of MIA 112, e.g., after enters the text or speaks user input 211A (the email address in screen display 200D). Screen display 200E displays "Searching for customer . . . " as the tool performs a search for this user in CRM tool.

Screen display 200F displays a next page of MIA 112, e.g., where the search for the user fails to find a customer from screen display 200E. As discussed below, AI platform 130 may determine that no customer exists matching the email address by formulating an API call to an appropriate tool offered in CRM core services 120. For example, an object may exist for customers, and a tool may exist to access information about customers in the CRM tool. The CRM tool may provide an API call to lookup customers, and MIA 112 may send an API call to this tool, receive a response, and determine that the customer is not found. MIA 112 may leverage LLM 140 to assist with this in the manner discussed below with reference to FIG. 4.

Screen display 200G displays a natural language input entered by user 102 in response to the failed user search from screen display 200F. Prompt 210B asks user 102 "What's the customer's name and phone number?" In turn, user 102 types or speaks "I'm with Doug DeMuro and his number is 123-456-7890" as indicated in user input 2111B.

Screen display 200H displays a next page in which MIA 112 creates a customer in the tool and displays the information in an appropriate format. User 102 may confirm the creation of the new customer. MIA 112 may access an appropriate tool in CRM core services that provides an API call for creating new customers. MIA 112 may formulate an appropriate call using the natural language input from user 102 as a parameter.

Screen Xdisplay 200I displays a next page in which MIA 112 allows user 102 to select from additional recommended actions "Generate Visit" and "Search Inventory" or enter additional natural language input.

Screen display 200J displays a next page in which user 102 generates a store visit. User 102 may confirm the creation of the store visit.

Screen display 200K displays a next page in which MIA 112 allows user 102 to select from additional recommended actions "Search Inventory" and "Schedule a Test Drive" or enter additional natural language input.

Screen display 200L displays a natural language input entered by user 102 from screen display 200K. Namely, user 102 types or says "Show me our fast cars under $50,000."

Screen display 200M displays a subsequent page in which MIA 112 displays the fast cars in the inventory that cost less than $50,000. As discussed below, AI platform 130 may perform the search of the inventory by formulating an API call to an appropriate tool offered in CRM core services 120. For example, an tool may exist that allows users to search a vehicle inventory. MIA 112 may send to this tool an API call formulated to query all cars having a threshold horsepower/max speed costing less than $50,000, receive a response, and determine that the customer is not found. MIA 112 may leverage LLM 140 to assist with this in the manner discussed below with reference to FIG. 4.

Screen display 200N displays an alternative embodiment in which MIA 112 takes the form of a text conversation. In this embodiment, user 102 asks "What is my next job?" As discussed below with reference to FIG. 4, MIA 112 may retrieve an appropriate "job" object from the CRM tool (perhaps formatted in JSON) and display the retrieved object in the interface. In this example, the customer, location, and status of the job are displayed.

Figure 3:
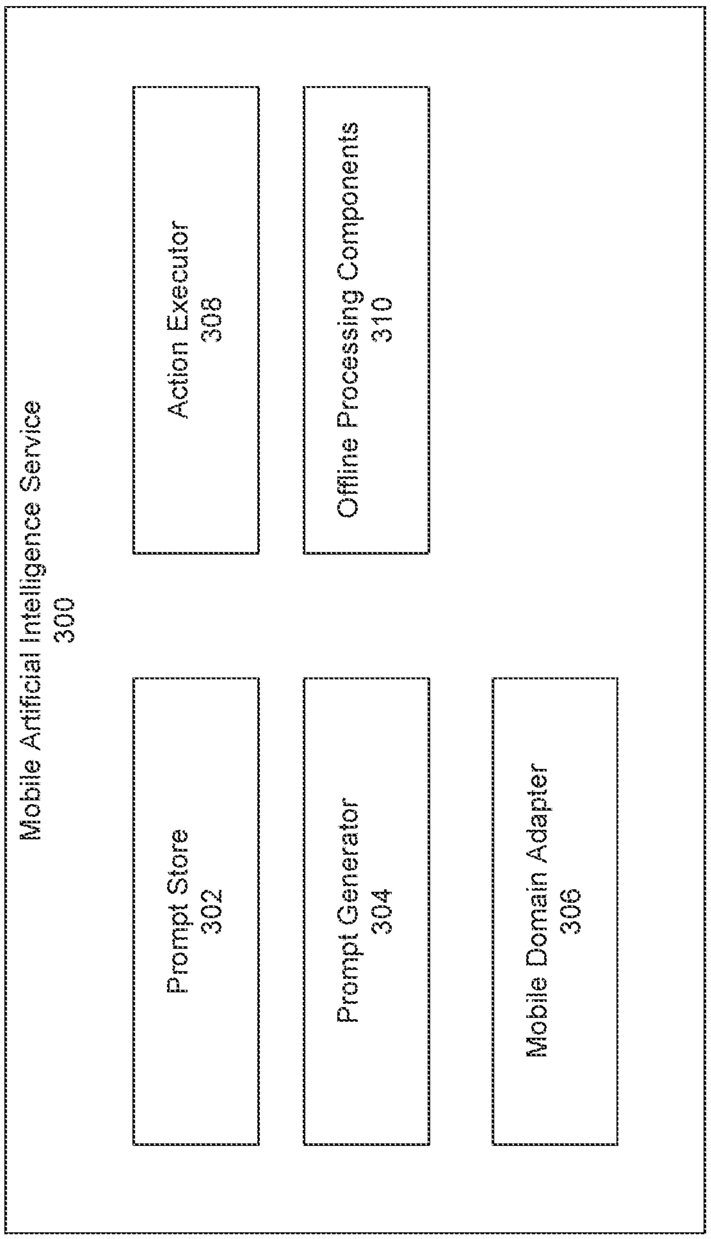
FIG. 3 is a block diagram of a mobile AI service, according to some embodiments.

FIG. 3 is a block diagram of mobile AI service 300, according to some embodiments. As illustrated in FIG. 1, mobile AI service 300 may include prompt store 302, prompt generator 304, mobile domain adaptor 306, action executor 308, and offline processing components 310.

Prompt store 302 may store prompt templates used by AI platform 130 to generate prompts used to receive an execution plan from LLM 140. An example prompt may read: "Answer the following question using JSON only:/(text)/." However, prompt store 302 may also store more complex prompts. such as the prompt indicated in FIG. 5B. Prompt store 302 may store domain-specific prompts—e.g., the prompt in FIG. 5B may be uniquely applicable to a user that is a field technician in a CRM tool that handles on-site servicing.

Prompt generator 304 may generate initial and subsequent prompts for use in MIA 112. In an embodiment, prompt generator 304 may retrieve an appropriate prompt from prompt store 302 and inject information into the variables in that prompt. Prompt generator 304 may use the natural language input from user 102 towards this end. For the example prompt, above, prompt generator 304 may inject the user's natural language input of "What is my next work item?" into the prompt, resulting in an initial prompt of: "Answer the following question using JSON only: What is my next work item?" Prompt generator 302 may also retrieve information from CRM core services 120 about the customer, user, etc. to fill in this information. For example, the prompt displayed in FIG. 5B may use variables and retrieved, injected data from the CRM tool to populate the details of the prompt.

Additionally, prompt generator 304 may include in the prompt one or more tools that are available in the CRM tool. These tools may be standard tools, such as a querying tool or custom tools specific to a customer. These tools may be APIs with a defined description, input model, and output model. In one embodiment, the input and output models may also be included in the prompt. Prompt generator 304 may also include an appropriate reasoning strategy in the prompt. An appropriate prompt may cause LLM 140 to parse the natural language input, determine which of the tools to use to achieve the goal(s) of the user, and create an execution plan for that tool to achieve the user goal.

Mobile domain adaptor 306 may be a mobile device framework that includes components needed that interact with AI platform 130 and/or CRM core services 120 on device 104. Mobile domain adaptor 306 may include client-side libraries, code, applications, and other tools the contents of which will be understood by one skilled in the relevant arts. In an embodiment, mobile domain adaptor 306 may also interact with offline LLM 118 to achieve offline features of MIA 112.

Action executor 308 may perform/submit/execute API calls to available tools provided by CRM core services 120. For example, action executor 308 may perform CRUD operations by accessing a tool provided by the CRM tool for this purpose. Action executor 308 may also access custom objects and/or custom tools unique to a particular customer of the CRM tool. In one embodiment, action executor 308 may rely send appropriate HTTP requests and responses to the APIS, and action executor 308 may employ cURL or other suitable library or command-line interface to effectuate the API calls.

Offline processing components 310 may support offline use cases and interactions with the CRM tool when device 104 lacks network connectivity. For example, offline processing components 310 may support user 102 when they go offline. User 102 may complete an action in the CRM tool using the MIA and offline processing components 310. Offline processing components 310 may sync with the CRM tool when the user returns to network connectivity. Towards this end, offline processing components may include an offline database that stores information on the client device and synchronizes with a server-side database when reconnected.

Figure 4:
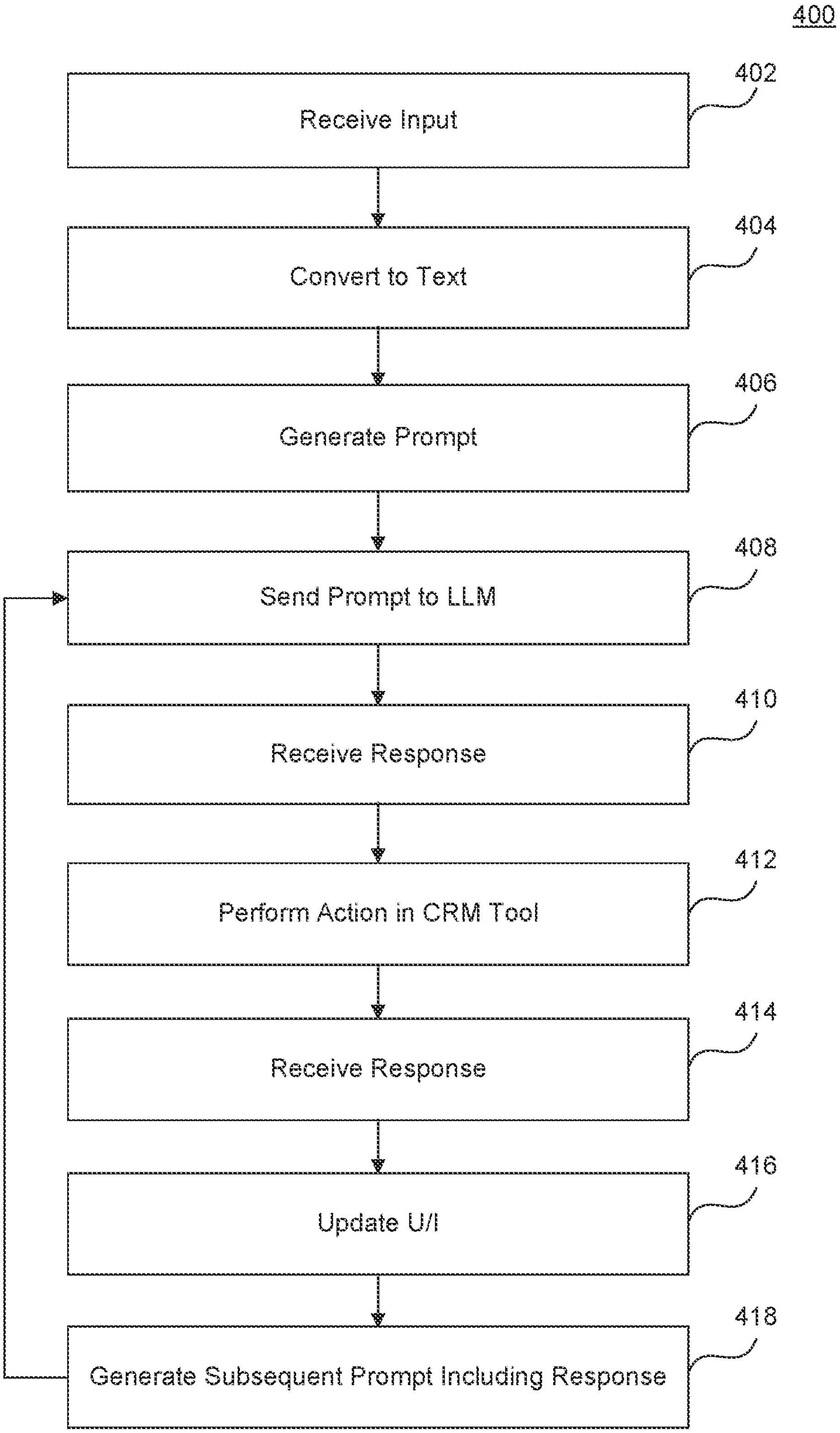
FIG. 4 illustrates a method for providing a user interface powered by AI, according to some embodiments.

FIG. 4 illustrates a method 400 for providing a user interface powered by AI, according to some embodiments. Method 400 may be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art(s).

Figure 2L:
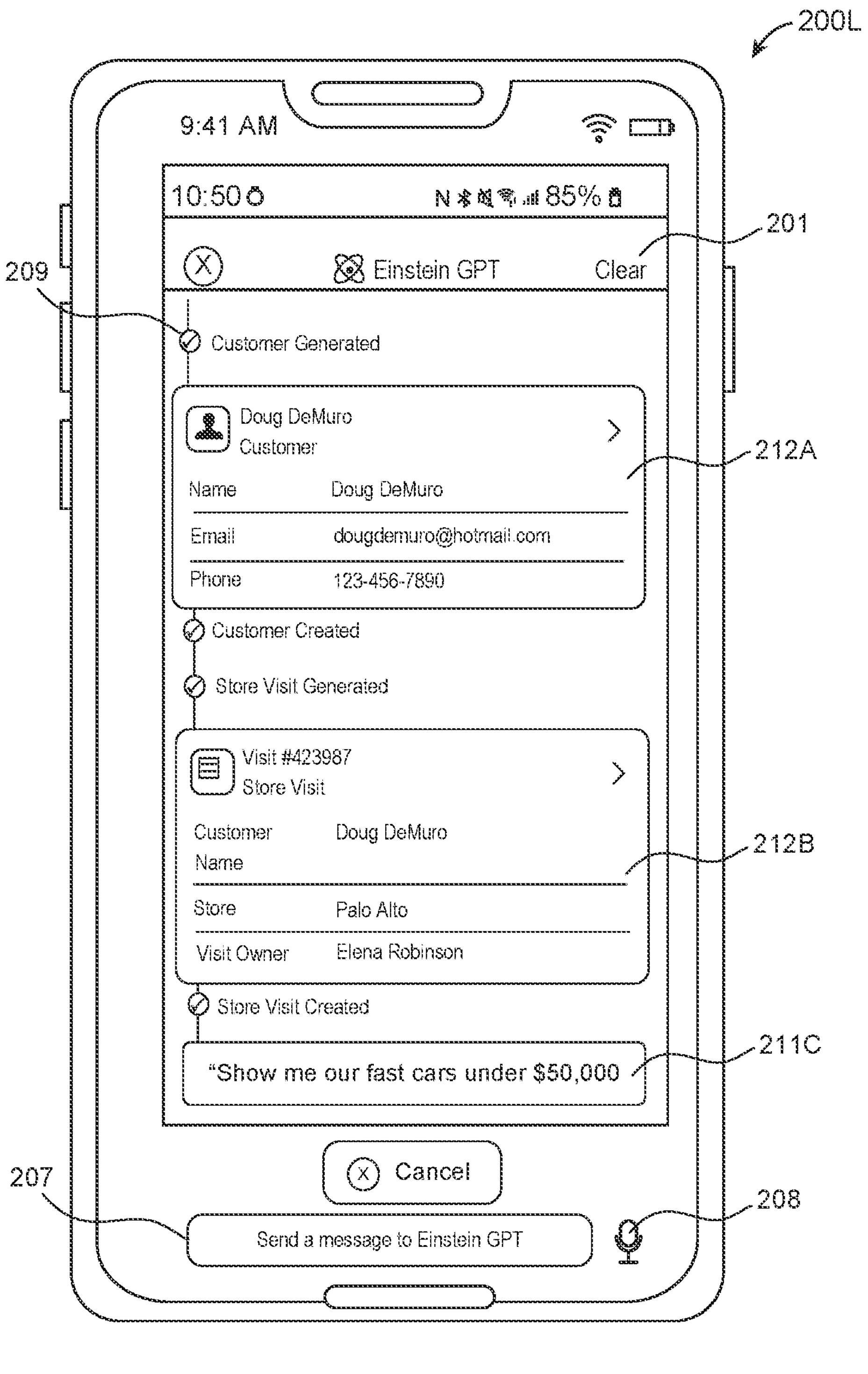
Figure 2M:
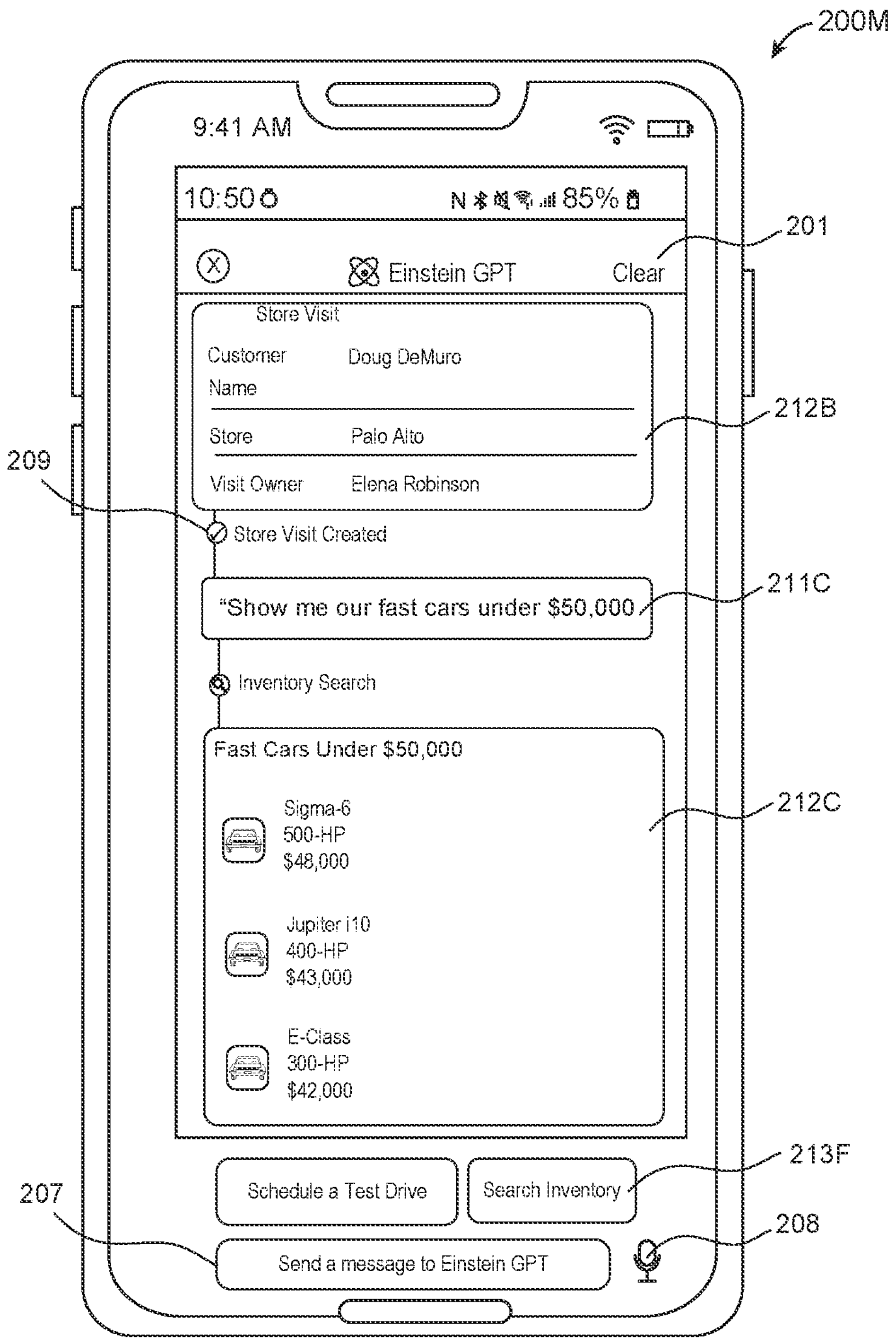
Figure 2N:
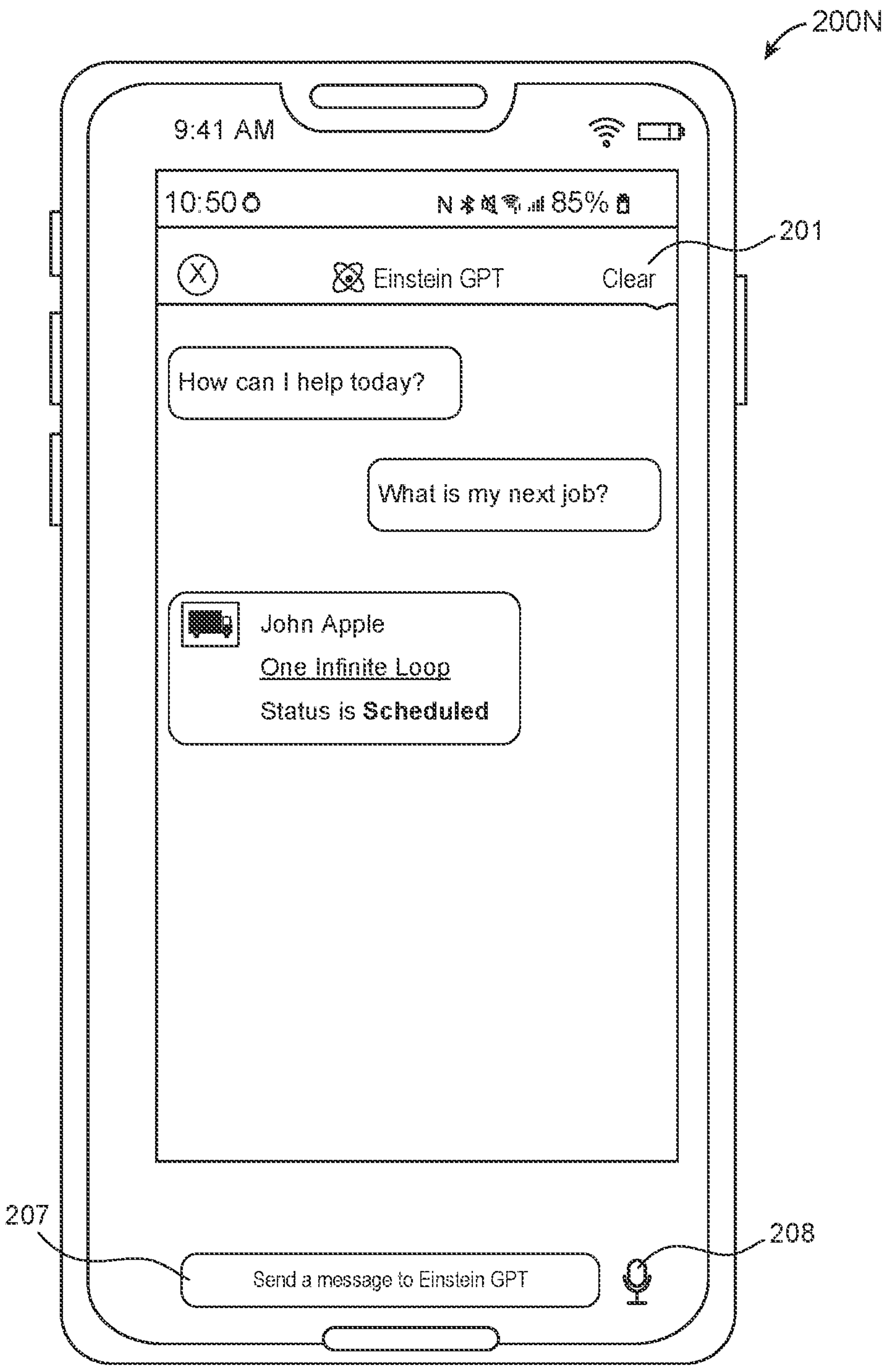

In 402, MIA 112 may receive a natural language input from user 102. The natural language input may be text or spoken language. MIA 112 may receive the natural language input in a self-contained interface such as that discussed above with reference to FIGS. 2A-2N. For example, user 102 may ask "What is my next work item?" Or as illustrated in FIG. 2L, user 102 may type "Show me our fast cars under $50,000." In this fashion, user 102 may provide a nearly limitless possibilities regarding requests/questions/statements using spoken word. In an embodiment, the natural language may be a hint provided by MIA 112 as a recommendation. For example, MIA 112 may provide a suitable list of selections as a starting menu and recommend additional follow-up actions in response to a first received natural language input.

In 404, MIA 112 may employ speech-to-text framework 114 to convert spoken language to a text string by employing speech-to-text framework 114. Step 404 may be skipped if the natural language input received in 402 is inputted as text. Speech-to-text framework 114 may receive as input an audio file and return as output a text string. In an embodiment, speech-to-text framework 114 may leverage a third-party voice recognition tool or speech-to-text service.

In 406, MIA 112 may employ prompt generator 304 to generate an initial prompt. In one example, the natural language received in 402 may be "What is my next work item?" As an illustrative first example, MIA 112 may employ prompt generator 304 to create a prompt "Answer the following question using JSON only: What is my next work item." In one embodiment, an initial prompt may include a data model to use, validation rules, and a list of commands to be run. One such example in FIG. 5A illustrates an example reasoning strategy and output model. This prompt includes a reasoning strategy that provides additional context for the LLM—i.e., "You are now an intelligent assistant that will help a field service technician . . . . When you read 'starting the job', it means the status should be 'In Progress.'"

However, this approach may require prompt generator 304 to specify available commands to run and the format for responses, which results in a static flow. Thus, in another embodiment, prompt generator 304 may include a set of tools that are API with well-defined description and input/output model. A tool may be a function with a name and a description. For example, a tool can be an SOQL query tool (for querying data in the CRM tool). The CRM tool may include predefined tools, such as the SOQL query tool, but custom tools may be integrated as well across customers. A description of the API may be included in the prompt or otherwise be accessible. An API may output its result in a well formatted schema, such as JSON. Thus, in another embodiment, the initial prompt may include a set of tools and a reasoning strategy (text guiding the LLM). An illustrative approach to including this information in a prompt is displayed in FIG. 5D. An input model (guidance on the input data such as a JSON schema) and an output model (guidance on the output such as JSON schema) may be provided in the prompt or inferred by the LLM based on the description of the API.

Moreover, MIA 112 may leverage a prompt template from prompt store 302 in creating the initial prompt. Such a template is illustrated in FIG. 5B. The variable "(text)" may be replaced by the natural language received in 402, e.g., "What is my next job?" Additional variables maybe be included to generate an appropriate prompt for a particular user—e.g., technicianName, location, customerName, case status, etc. of FIG. 5B may be replaced with variables and populated with data from the CRM tool when generating the initial prompt.

In 408, MIA 112 may send the initial prompt to LLM 140. In another embodiment, MIA 112 may process the initial prompt using offline LLM 118. LLM 140 may receive the prompt and determine and generate one or more specific, performable actions in the form of API calls to functions in CRM core services 120. For example, in response to "What is my next job?" MIA 112 may generate an execution plan for retrieving that user's servicing information. This may take the form of an API call with appropriate parameters to a querying tool that retrieves information for the requesting user related to their next service job.

In 410, MIA 112 may receive a response from LLM 140. A response from the LLM may adhere to the output model format specified in JSON in the initial prompt. The response may be an execution plan that includes one or more API calls. The API calls may be to standard and custom tools available within the CRM tool. The API calls may include appropriate parameters to retrieve information specific to the requesting user.

In 412, MIA 112 may employ action executor 308 to perform an appropriate action at an appropriate tool available in the CRM tool. This may involve action executor 308 performing CRUD operations by accessing a tool provided by the CRM tool for this purpose. Action executor 308 may also access custom objects and/or custom tools unique to a particular customer of the CRM tool. In one embodiment, action executor 308 may rely on cURL or other suitable library or command-line interface to effectuate the API calls.

In 414, MIA 112 may receive a response from the tools for the one or more API calls. The response may be in JSON or adhere to other suitable output model. To continue the "What is my next job?" example, MIA may receive a JSON "job" object that resembles the following structured data:

```
{
  "job": {
    "recordID": "a03RN000000qyUIYAY",
    "technicianName": "Glen",
    "caseStatus": "In Progress",
    "location": "One Infinite Loop",
    "customerName": "John Apple"
  }
}
```

In 416, MIA 112 may employ user interface generator 116 to update the MIA based on the response. In particular, MIA 112 may use received structured data to update the interface with the information. To continue the above example, the structured data received in 141 may be used by user interface generator 116 to display the information received in the "job" object. An example of this is displayed in screen display 200N. MIA 112 may retrieve an appropriate "job" object from the CRM tool (perhaps formatted in JSON) and display the retrieved object in the interface. In this example, the customer, location, and status of the job are displayed.

In 418, MIA 112 may generate a subsequent prompt that includes the initial prompt, the response, and additional natural language received from user 102. An exemplary subsequent prompt is displayed in FIG. 5C. Such prompt chaining allows MIA 112 to incorporate knowledge from prior interactions into a prompt, making the LLM aware of the history of the conversation.

FIGS. 5A-5D illustrate exemplary prompts, according to some embodiments. FIG. 5A illustrates an exemplary domain-specific prompt generated for a use case involving a field technician in a CRM tool that handles on-site servicing. This is merely exemplary however. In an embodiment, the prompt in FIG. 5A may specify one or more tools provided by the CRM tool. These tools may include both standards tools (e.g., a querying tool) and custom tools integrated for/by a particular customer. Tools may be APIs with a defined description, input model, and output model, and this information may also be included in the prompt.

FIG. 5B illustrates a prompt that uses a prompt template to fill in the natural language input received from a user. The placeholder "\(text) may be replaced by the natural language input. One skilled in the relevant arts will understand than many other suitable placeholders may be employed to inject data. Moreover, this data may be retrieved from the CRM tool or external client as well.

FIG. 5C illustrates a prompt illustrating prompt chaining. In FIG., an initial prompt is generated based on the text "What is my next job?" The entirety of this prompt is then retained in a subsequent prompt generated in response to a second natural language input of "Thanks. I am at the location now and starting the job." Such prompt chaining allows MIA 112 to incorporate knowledge from prior interactions into a prompt, making the LLM aware of the history of the conversation.

FIG. 5D illustrates a prompt that includes information about objects that may be manipulated/created using CRUD operations. Here, the prompt includes the objects that are available for a particular intelligent assistant (in this case, for a car dealership). The prompt specifies the fields that are available in each of those objects. For example, an employee object may include employee_id, first_name, last_name, and contact_number. The prompt may also include the fields that are required to create a record for these objects. For example, to create a customer object, the CRUD operation may need to include first_name, last_name, and email_id. In such an example, a user may provide an input of "Please create customer record for James Paul." MIA 112 would process this input by generating an appropriate prompt including the information in FIG. 5D and the user input. LLM 140 may then determine based on the prompt that the request lacks the email_id needed to create the customer record and return a response of "email_id information is required to create customer record" or other suitable error in JSON. User interface generator 116 may then display this response in the conversational interface and process further interactions with the user (e.g., the user could specify the email address, and MIA 112 may then create the customer record).

In the example displayed in FIG. 5D, the fields correspond to a single API such as an API that performs CRUD operations in a CRM tool. However, in an embodiment, the prompt may specify a set of tools that each are different APIs with well-defined description and input/output models. Additionally, in one embodiment, the prompt may be built programmatically by referencing an API specification or API function call to determine the available objects, member functions, fields, required data, etc.

Figure 6:
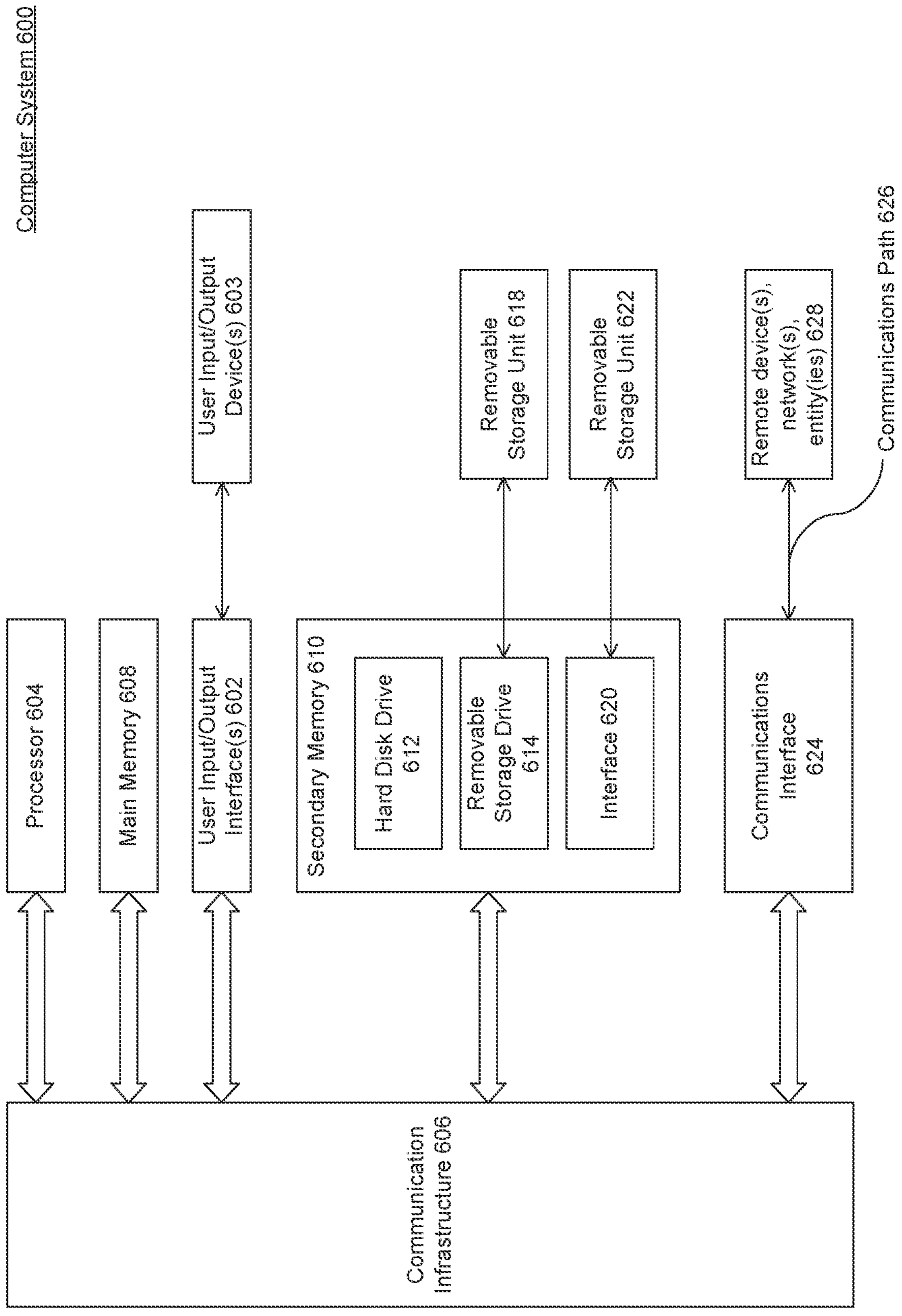
FIG. 6 illustrates a computer system, according to exemplary embodiments of the present disclosure.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 608, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for providing a user interface powered by artificial intelligence, comprising:

providing a mobile intelligence assistant in the user interface of a mobile application of a customer relationship management (CRM) tool that provides a plurality of services;

receiving a natural language input via the mobile intelligence assistant;

retrieving customer data from the CRM tool and a domain-specific template based on a customer type stored in the CRM tool, wherein the domain-specific template comprises a first variable and a second variable;

building an initial prompt by replacing the first variable in the domain-specific template with the natural language input and replacing the second variable in the domain-specific template with the customer data, the initial prompt comprising, a reasoning strategy, an input model, an output model, and a description of each of the plurality of services;

creating an execution plan comprising an application programming interface (API) call to a service in the one or more services and at least one user-specific parameter by providing the initial prompt to a generative artificial intelligence comprising a large language model;

executing the API call to receive a response from the service;

determining one or more additional actions to perform in the CRM tool based on the response; and updating, by one or more processors, the user interface to display the response and the one or more additional actions as one or more selectable user inputs in the user interface.

2. The method of claim 1, further comprising:

building a subsequent prompt comprising the initial prompt, the response, the description of the plurality of services, and a second natural language input received in the mobile intelligence assistant;

creating a second execution plan comprising a second API call to a second service in the plurality of services by providing the subsequent prompt to the generative artificial intelligence;

executing the second API call to receive a second response from the second service; and updating the user interface to display the second response.

3. The method of claim 2, further comprising:

displaying a breadcrumb trail comprising the natural language input, the response, the second natural language input, and the second response.

4. The method of claim 3, further comprising:

storing the breadcrumb trail as a session; and displaying one or more past sessions, including the session, on a history page in the user interface.

5. The method of claim 1, wherein the large language model is deployed on a client device running the mobile application.

6. The method of claim 1, wherein the generative artificial intelligence accesses a plurality of purpose-built large language models and determines a particular purpose-built large language model to access based on the natural language input.

7. The method of claim 1, wherein the input model and the output model are specified in a JavaScript Object Notation (JSON) format.

8. The method of claim 1, wherein the natural language input is spoken by the user and received by the mobile application.

9. The method of claim 1, further comprising:

receiving device-specific data from a device API on a client device running the mobile application; and including the device-specific data in the initial prompt.

10. The method of claim 9, wherein the device-specific data can be: (1) an image received from a camera running on the client device; (2) a barcode scanned by the client device; and/or (3) a location provided by a location service running on the client device.

11. The method of claim 1, wherein the service provides an API that accesses or modifies an object in the CRM tool.

12. The method of claim 1, wherein the building the initial prompt further comprises:

querying the CRM tool to determine the plurality of services;

performing a vector search to determine a particular service in the plurality of services based on the natural language input; and including a description of the particular service in the initial prompt.

13. The method of claim 1, wherein the large language model is trained using data from the CRM tool.

14. A system for providing a user interface powered by artificial intelligence, comprising:

a memory; and at least one processor coupled to the memory and configured to:

provide a mobile intelligence assistant in the user interface of a mobile application of a customer relationship management (CRM) tool that provides a plurality of services;

receive a natural language input via the mobile intelligence assistant;

retrieve customer data from the CRM tool and a domain-specific template based on a customer type stored in the CRM tool, wherein the domain-specific template comprises a first variable and a second variable;

build an initial prompt by replacing the first variable in the domain-specific template with the natural language input and replacing the second variable in the domain-specific template with the customer data, the initial prompt comprising a reasoning strategy, an input model, an output model, and a description of each of the plurality of services;

create an execution plan comprising an application programming interface (API) call to a service in the one or more services and at least one user-specific parameter by providing the initial prompt to a generative artificial intelligence comprising a large language model;

execute the API call to receive a response from the service;

determine one or more additional actions to perform in the CRM tool based on the response; and update the user interface to display the response and the one or more additional actions as one or more selectable user inputs in the user interface.

15. The system of claim 14, the at least one processor further configured to:

build a subsequent prompt comprising the initial prompt, the response, the description of the plurality of services, and a second natural language input received via the mobile intelligence assistant;

create a second execution plan comprising a second API call to a second service in the plurality of services by providing the subsequent prompt to the generative artificial intelligence;

execute the second API call to receive a second response; and update the user interface to display the second response.

16. The system of claim 14, wherein the large language model is deployed on a client device running the mobile application.

17. The system of claim 14, wherein the generative artificial intelligence accesses a plurality of purpose-built large language models and determines a particular purpose-built large language model to access based on the natural language input.

18. The system of claim 14, wherein the input model and the output model are specified in a JavaScript Object Notation (JSON) format.

19. A non-transitory computer-readable device having instructions stored thereon that, when executed by at least one computing device, causes the at least one computing device to perform operations for providing a user interface powered by artificial intelligence, the operations comprising:

providing a mobile intelligence assistant in the user interface of a mobile application of a customer relationship management (CRM) tool that provides a plurality of services;

retrieving customer data from the CRM tool and a domain-specific template based on a customer type stored in the CRM tool, wherein the domain-specific template comprises a first variable and a second variable;

building an initial prompt by replacing the first variable in the domain-specific template with the natural language input and replacing the second variable in the domain-specific template with the customer data, the initial prompt comprising a reasoning strategy, an input model, an output model, and a description of each of the plurality of services;

creating an execution plan comprising an application programming interface (API) call to a service in the one or more services and at least one user-specific parameter by providing the initial prompt to a generative artificial intelligence comprising a large language model;

executing the API call to receive a response from the service; determining one or more additional actions to perform in the CRM tool based on the response; and updating the user interface to display the response and the one or more additional actions as one or more selectable user inputs in the user interface.

20. The non-transitory computer-readable device of claim 19, the operations further comprising:

building a subsequent prompt comprising the initial prompt, the response, the description of the plurality of services one or more tools, and a second natural language input received in the mobile intelligence assistant;

creating a second execution plan comprising a second API call to a second service in the plurality of services one or more tools by providing the subsequent prompt to the generative artificial intelligence;

executing the second API call to receive a second response from the second tool; and updating the user interface to display the second response.

* * * * *